United States Patent
Artzi et al.

(10) Patent No.: US 8,516,449 B2
(45) Date of Patent: *Aug. 20, 2013

(54) DETECTING AND LOCALIZING SECURITY VULNERABILITIES IN CLIENT-SERVER APPLICATION

(75) Inventors: Shay Artzi, Brookline, MA (US); Julian Dolby, Bronx, NY (US); Marco Pistoia, Amawalk, NY (US); Frank Tip, Ridgewood, NJ (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/902,423

(22) Filed: Oct. 12, 2010

(65) Prior Publication Data
US 2011/0030061 A1 Feb. 3, 2011

Related U.S. Application Data

(63) Continuation-in-part of application No. 12/502,519, filed on Jul. 14, 2009.

(51) Int. Cl.
G06F 9/44 (2006.01)
(52) U.S. Cl.
USPC ........... 717/127; 717/124; 717/130; 717/131; 726/23
(58) Field of Classification Search
USPC ..................................................... 726/22–25
See application file for complete search history.

(56) References Cited

U.S. PATENT DOCUMENTS

| | | | |
|---|---|---|---|
| 6,173,440 B1 * | 1/2001 | Darty | 717/130 |
| 6,442,694 B1 * | 8/2002 | Bergman et al. | 726/22 |
| 6,701,460 B1 * | 3/2004 | Suwandi et al. | 714/41 |
| 6,707,795 B1 * | 3/2004 | Noorhosseini et al. | 370/242 |
| 6,823,507 B1 * | 11/2004 | Srinivasan et al. | 717/152 |
| 6,895,551 B1 * | 5/2005 | Huang et al. | 715/205 |
| 6,928,449 B2 * | 8/2005 | Ten-Hove et al. | 1/1 |

(Continued)

OTHER PUBLICATIONS

Abreu, Rui, Peter Zoeteweij, and Arjan JC Van Gemund. "On the accuracy of spectrum-based fault localization." Testing: Academic and Industrial Conference Practice and Research Techniques-Mutation, 2007. TAICPART-Mutation 2007. IEEE, 2007.*

(Continued)

Primary Examiner — Wei Zhen
Assistant Examiner — Matthew Brophy
(74) Attorney, Agent, or Firm — Jon A. Gibbons; Fleit Gibbons Gutman Bongini & Bianco PL

(57) ABSTRACT

The present invention provides a system, computer program product, and a computer implemented method for analyzing a set of two or more communicating applications. The method includes executing a first application, such as a client application, and executing a second application, such as a server application. The applications are communicating with each other. A correlation is recorded between the applications and an execution characteristic exhibited on execution. An oracle is used to determine an analysis of the first application that has been executed. The execution of the first application causes a change of state in the second application and/or a change control flow in the second application. Code fragment in the first application and/or the second application are prioritized based on an evaluation produced by the oracle, and based on the correlation between the code fragments that have been executed and the execution characteristic exhibited by the code fragments.

25 Claims, 10 Drawing Sheets

(56) References Cited

U.S. PATENT DOCUMENTS

| | | | |
|---|---|---|---|
| 7,096,074 B2* | 8/2006 | Yulevitch et al. | 700/21 |
| 7,131,037 B1* | 10/2006 | LeFaive et al. | 714/46 |
| 7,379,994 B2* | 5/2008 | Collazo | 709/224 |
| 7,647,528 B2* | 1/2010 | Yilmaz et al. | 714/38.1 |
| 7,665,066 B2* | 2/2010 | Sauer et al. | 717/124 |
| 7,681,182 B1* | 3/2010 | Mistry et al. | 717/132 |
| 7,720,662 B1* | 5/2010 | Aldrich | 703/13 |
| 7,926,114 B2* | 4/2011 | Neystadt et al. | 726/25 |
| 8,015,139 B2* | 9/2011 | Bahl et al. | 706/46 |
| 8,051,330 B2* | 11/2011 | Cinato et al. | 714/26 |
| 8,065,554 B2* | 11/2011 | Herscovitz et al. | 714/4.1 |
| 8,065,565 B2* | 11/2011 | Chilimbi et al. | 714/38.1 |
| 8,108,513 B2* | 1/2012 | Kiciman et al. | 709/224 |
| 8,132,180 B2* | 3/2012 | Agarwal et al. | 719/316 |
| 8,151,146 B2* | 4/2012 | Ostrand et al. | 714/47.1 |
| 8,356,287 B2* | 1/2013 | Tzoref et al. | 717/130 |
| 8,392,515 B2* | 3/2013 | Kakivaya et al. | 709/206 |
| 8,407,673 B2* | 3/2013 | Terpolilli | 717/127 |
| 2004/0181710 A1* | 9/2004 | Sauer et al. | 714/38 |
| 2005/0193281 A1* | 9/2005 | Ide et al. | 714/47 |
| 2007/0016894 A1* | 1/2007 | Sreedhar | 717/131 |
| 2007/0038896 A1* | 2/2007 | Champlin et al. | 714/38 |
| 2007/0083933 A1* | 4/2007 | Venkatapathy et al. | 726/25 |
| 2007/0179746 A1* | 8/2007 | Jiang et al. | 702/185 |
| 2008/0016115 A1* | 1/2008 | Bahl et al. | 707/104.1 |
| 2008/0172576 A1* | 7/2008 | Kusko et al. | 714/33 |
| 2008/0276228 A1* | 11/2008 | Sreedhar | 717/131 |
| 2009/0113399 A1* | 4/2009 | Tzoref et al. | 717/130 |
| 2009/0248901 A1* | 10/2009 | Medin, Jr. | 709/249 |
| 2009/0249298 A1* | 10/2009 | Blount et al. | 717/125 |
| 2011/0016356 A1* | 1/2011 | Artzi et al. | 714/38 |
| 2011/0016456 A1* | 1/2011 | Artzi et al. | 717/131 |
| 2011/0016457 A1* | 1/2011 | Artzi et al. | 717/131 |
| 2011/0083123 A1* | 4/2011 | Lou et al. | 717/125 |

OTHER PUBLICATIONS

Agarwal, Manoj K., et al. "Problem determination using dependency graphs and run-time behavior models." Utility Computing. Springer Berlin Heidelberg, 2004. 171-182.*

Appleby, Karen, G. Goldszmidt, and Malgorzata Steinder. "Yemanja—A layered fault localization system for multi-domain computing utilities." Journal of Network and Systems Management 10.2 (2002): 171-194.*

Chen, Mike Y., et al. "Pinpoint: Problem determination in large, dynamic internet services." Dependable Systems and Networks, 2002. DSN 2002. Proceedings. International Conference on. IEEE, 2002.*

Steinder, Maigorzata, and Adarshpal S. Sethi. "The present and future of event correlation: A need for end-to-end service fault localization." Proc. IIIS SCI: World Multi-Conf. Systemics Cybernetics Informatics. 2001.*

Abreu, Rui, et al., "An Evaluation of Similarity Coefficients for Software Fault Localization," Software Technology Department, Faculty of Electrical Engineering, Mathematics, and Computer Science, Delft University of Technology, The Netherlands. In PRDC 2006, pp. 39-46, 2006.

Agrawal, Hiralal, et al., "Fault Localization Using Execution Slices and Dataflow Tests," Proceedings of the Sixth International Symposium on Software Reliability Engineering (ISSRE95), pp. 143-151, Toulouse, France, Oct. 1995.

Artzi, Shay, et al., "Finding Bugs in Dynamic Web Applications," ISSTA '08, Jul. 20-24, 2008, Seattle, Washington, Copyright 2008 ACM 978-1-60558-050-0/08/07.

Cadar, Cristian, et al., "EXE: Automatically Generatng Inputs of Death," CCS'06, Oct. 30-Nov. 3, 2006, Alexandria, Virginia, Copyright 2006, ACM 1-59593-518-5/06/0010.

Cleve, Holger, et al., "Locating Causes of Program Failures," ICSE '05, May 15-21, 2005, St. Louis, Missouri, Copyright 2005 ACM 1-58113-963-2/05/0002.

Dallmeier, Valentin, et al., "Lightweight Defect Localization for Java," Saar;amd moversotu. Saarbrucken, Germany, ECOOP, pp. 528-550, 2005.

Godefroid, Patrice, et al., "DART: Directed Automated Random Testing," PLDI'05, Jun. 12-15, 2005, Chicago, Illinois, Copyright 2005, ACM 1-59503-056-6/05/0006.

Godefroid, Patrice, et al., "Automated Whitebox Fuzz Testing," NDSS, 2008.

Horwitz, Susan, "Interprocedural Slicing Using Dependence Graphs," SCM/SIGPLAN Conference on Programing Language Design and Implementation (1979-199): A Selection, 2003. Copyright 2003 ACM 1-58113-623-4.

Hutchins, M., et al., "Experiments on the Effectivenes of Dataflow— and Controlflow-Based Test Adequacy Critera," 0270-5257/94, Copyright 1994 IEEE.

Jones, James A., et al., "Epirical Evaluation of the Tarantula Automatic Fault-Localization Technique," ASE'05, Nov. 7-11, 2005, Long Beach, California, copyright 2005, ACM 1-58113-993-4/05/0011.

Jones, James A., et al., "Vizualization of Test Information to Assist Fault Localization," Proceedings of the International Conference on Software Engineering, Orlando, Florida, May 2002, ACM Copyright.

Libit, Ben, et al, "Bug Isolation via Remote Program Sampling," PLDI'03, Jun. 9-11, 2003, San Diego, California, copyright 2003 ACM 1-58113-662-5/03/006.

Liblit, Ben, et al., "Scalable Statistical Bug Isolation," PLDI'05, Jun. 12-15, 2005, Chicago, Illinois, copyright 2005, ACM 1-59593-080-0/05/0006.

Liu, Chao, et al., "SOBER: Statistical Model-Based Bug Localization," ESEC-FSE'05, Septeber 5-9, 2005, Lisbon, Portugal, copyright 2005 AC 1-59593,014,0/05/0009.

Pan, Hsin, et al., "Heiristics for Automatic Localization of Software Faults," Technical Report SERC-TR-116-P, Purdue University, Jul. 1992.

Renieris, Manos, et al., "Fault Localization with Nearest Neighbor Queries," In ASE, pp. 30-39, 2003.

Sen, Koushik, et al., "CUTE: A Concolic Unit Testing Engine for C," ESEC-FSE'05, Sep. 5-9, 2005, Lisbon, Portugal, copyright 2005 ACM 1-59593-014/0/05/0009.

Stoerzer, Maximilian, et al., "Finding Failure-Inducing Changes in Java Programs Using Change Classification," SIGSOFT'06/FSE-14, Nov. 5-11, 2006, Portland Oregon, copyright 2006, ACM 1-59593-468-5/06/0011.

Tip, Frank, "A Survey of Program Slicing Techniques," Journal of Programming Languages, 3(3):121-189, 1995.

Wassermann, Gary, et al., "Dynamic Test Input Generation for Web Applications," ISSTA'08, Jul. 20-24, 2008, Seattle, Washington, copyright 2008, ACM 978-1-59593-904-3/08/07.

Yu, Yanbing, et al., "An Empirical Study of the Effects of Test-Suite Reduction on Fault Localization," ISCSE'08, May 10-18, 2008, Leipzig, Germany, copyright 2008, ACM 978-1-60558-079-1/08/05.

Zeller, Andreas, "Yesterday, my program worked. Today, it does not. Why?", FSE< vol. 1687 of Lecture Notes in Computer Science, pp. 253-267, Springer, Sep. 1999.

Zeller, Andreas," Isolating Cause-Effect Chains from Computer Programs," SIGSOFT 2002/FSE-10, Nov. 18-22, 2002, Charleston, SC, copyright 2002 ACM 1-58113-514-9/02/0011.

Anand, Saswat, et al., "Demand-Driven Compositional Symbolic Execution," in TACAS, 2008.

Brumley, David, et al., "Towards Automatic Discovery of Deviations in Binary Implementations with Applications to Error Detection and Fingerprint Generation," Proceedings of 16th USENIX Security Symposium on USENIX Security Syposium, 2007.

Cadar, Cristian, et al, "KLEE: Unassisted and Automatic Generation of High-Coverage Tests for Complex Systems Programs," in OSDI, 2008.

Cadar, Cristian, et al., "Execution Generated Test Cases: How to Make Systems Code Crash Itself," in SPIN 2005.

Wasserman, Gary, et al., "Dynamic Test Input Generation for Web Applications," ISSTA'08, Jul. 20-24, 2008, Seattle, Washington, copyright 2008 AC 978-1-59593-904-3/08/07.

Godefroid, Patrice, "Compositional Dynamic Test Generation," POPL'07, Jan. 17-19, 2007, Nice, France, copyright 2007, ACM 1-59593-575-4/07/0001.

Godefroid, Patrice, et al., "Grammar-based Whitebox Fuzzing," PLDI'08, Jun. 7-13, 2008, Tucson, Arizona, copyright 2008 ACM 978-1-59593-860-2/08/06.

Inkumsah, Kobi, et al., "Evacon: A Framework for Integrating Evolutionary and Concolic Testing for Object-Oriented Programs," in ASE 2007.

Majumdar, Rupak, et al., "Hybrid Concolic Testing," 29$^{th}$ International Conference on Software Engineering (ICSE'07), 0-7695-2828-7/07, copyright 2007 IEEE.

Majumdar, Rupak, et al., "Directed Test Generation Using Symbolic Grammars," ASE'07, Nov. 4-9, 2007, Atlanta, Georgia, copyright 2007 ACM 978-1-59593-882-4/07/0011.

Elbaum, Sebastian, et al., "Web Application Characterization Through Directed Requests," WODA'06, May 23, 2006, Shanghai, China, copyright 2006 ACM 1-59593-085-X/06/0005.

Elbaum, Sebastian, et al., "Leveraging User-Session Data to Support Web Application Testing," IEEE Trans. Softw. Eng., 31(3), 0098-5589/05, 2005.

Fisher, Marc, et al., "Dynamic Characterization of Web Application Interfaces," FASE 2007, LNCS 4422, pp. 260-275, 2007, copyright Sprger-Verlag Berlin Heidelberg 2007/.

Halfond, William, G.J., et al., "Improving Test Case Generation for Web Applications Using Automated Interface Discovery," ESEC/FES'07, Sep. 3-7, 2007, copyright 2007 ACM 978-1-59593-811-4/07/009.

Huang, Yao-Wen, et al., "Verifyiing Web Applications Using Bounded Model Checking,"Proceedings of International Conference on Dependable Systems and Networks, 2004.

Johns, Martin, et al., "SMask: Preventing Injection Attacks in Web Applications by Approximating Automatic Data/Code Separation," SAC'07 Mar. 11-15, 2007, Seoul, Korea, copyright 2007, ACM 1-59593-480-4/07/0003.

Jovanovic, Nenad, et al., "Pixy: A Static Analysis Tool for Detecting Web Application Vulnerabilities," in Security and Privacy, 2006.

Kiezun, Adam, et al., "Automatic Creation of SQL Injection and Cross-Site Scripting Attacks," in Proceedings of International Conference of Software Engineering, ICSE, 2009.

McAllister, Sean, et al., "Leveragng User Interations for In-Depth Testing of Web Applications," in Raid '08: Proceedings of the 11$^{th}$ International Symposium on Recent Advances in Intrusion Detection, pp. 191-210, Berlin, Heidelberg, 2008, Springer-Verlag.

Minamide, Yasuhiko, "Static Approximation of Dynamically Generated Web Pages," WWW 2005, May 10-14, 2005, Chiba, Japan, ACM 1-59593-046-9/05/005.

Pietraszek, Tadeusz, et al., "Defending Against Injection Attacks through Context-Sensitive String Evaluation," in RAID 2005.

Caprile, Bruno, et al., "Analysis and Testing of Web Applications," in ICSE 2001.

Sprenkle, Sara, et al., "Automated Replay and Failure Detection for Web Applications," ASE'05, Nov. 7-11, 2005, Long Beach, California, copyright 2005 ACM 1-58113-993-4/05/0011.

Su, Zhengong, et al., "The Essence of Command Injection Attacks in Web Applications,"POPL'06, Jan. 11-13, 2006, Charleston, South Carolina, copyright 2006 ACM 1-59593-02702/06/0001.

Wasserman, Gary, et al, "Sound and Precise Analysis of Web Applications for Injection Vulnerabilities," PLDI'07, Jun. 11-13, 2007, San Diego, California, copyright 2007, ACM 978-1-59593-633-2/07/0006.

Xie, Yichen, et al., "Static Detection of Security Vulnerabilities in Scripting Languages," in USENIX-SS, 2006.

Freire, Juliana, et al., "VeriWeb: Automatically Testing Dynamic Web Sites," in WWW 2002.

* cited by examiner

FIG. 1

```
1  <html>
2  <head>Login</head>
3  <body>
4    <form name="login" action="exampleLogin.php">
5      <input type="text" name="user"/>
6      <input type="password" name="pw"/>
7    </form>
8  </body>
9  </html>
```
(a) index.php

```
1  <?php
2    userTag = 'user';
3    pwTag = 'pw';
4    typeTag = 'type';
5  ?>
```
(b) constants.php

```
1  <HTML>
2  <?php
3  require( dirname(__FILENAME__).'/includes/constants.php');
4
5  $user = $_REQUEST[ 'user' ];
6  $pw   = $_REQUEST[ 'pw' ];
7
8  if (check_password($user, $pw) {
9      print "<HEAD>Login Successful</HEAD>\n";
10
11     $_SESSION[ $userTag ] = $user;
12     $_SESSION[ $pwTag ]   = $pw;
13 ?>
14 <BODY>
15   <FORM action="view.php">
16     <INPUT TYPE="text" NAME="topic"/>
17   </FORM>
18 </BODY>
19 <?php
20     if ($user == 'admin') {
21         $_SESSION[ $typeTag ] = 'admin';
22     }
23     else {
24         print "<HEAD>Login Failed</HEAD>\n";
25     }
26 ?>
27 </HTML>
```
(c) login.php

```
1  <HTML>
2  <HEAD>Topic View</HEAD>
3  <?php
4    print "<BODY>\n";
5    if(check_password($_SESSION[$userTag], $_SESSION[$pwTag]) {
6      require( dirname(__FILENAME__).'/includes/constants.php');
7
8      $type  = $_SESSION[ $typeTag ];
9      $topic = $_REQUEST[ 'topic' ];
10
11     if ($type == 'admin') {
12        print "<H1>Admin ";
13     } else {
14        print "<H1>Normal ";
15     }
16     print "View of $topic</H1>\n";
17
18     /* code to print topic view... */
19
20     if ($type == 'admin') {
21        print "<H2>Administrative Details\n";
22        /* code to print admin details.... */
23     }
24  } else {
25     print "Please Log in\n";
26  }
27  print "</BODY>\n";
28 ?>
29 </HTML>
```
(d) view.php

```
1 <HTML>
2 <HEAD>Topic View</HEAD>
3 <BODY>
4 <H1>Admin View of A topic</H1>
  ...
5 <H2>Administrative Details
  ...
6 </BODY>
7 </HTML>
```

(a) HTML output

| HTML line | PHP lines in 1(d) |
|---|---|
| 1 | 1 |
| 2 | 2 |
| 3 | 4 |
| 4 | 12, 16 |
| 5 | 21 |
| 6 | 27 |
| 7 | 29 |

(b) output mapping

Error at line 6, character 7: end tag for "H2" omitted; possible causes include a missing end tag, improper nesting of elements, or use of an element where it is not allowed
Line 5, character 1: start tag was here (c) Output of WDG Validator

FIG. 2 parameters: $\mathcal{P}$ Program, $S_0$ Initial environment state, $C$ Components executable from $S_0$, $O$ oracle;
$\mathcal{P}$,C:setOf(Executable component);
result : Bug reports $\mathcal{B}$;
$\mathcal{B}$:setOf({failure,setOf($\mathcal{T}$ test)});
T :{Executable component, Path constraint, Environment State}

```
1   B:=0;
2   pcQueue:=emptyQueue();
3   foreach component in C do
4       test:= {component, emptyPathConstraint();S₀};
5       enqueue(pcQueue,test);
6   while not empty(pcQueue) and not timeExpired() do
7       test:= dequeue(pcQueue);
8       component:=test:component;
9       input:= solve(test:pathConstraint);
10      if input, ≠⊥ then
11          restoreState(test,state);
12          output:= executeConcrete(component,input);
13          newState:=getCurrentState();
14          failures:= getFailures(O;output);
15          foreach f in failures do
16              merge {f,test} into B;
17          c₁ ∧ ...∧ cₙ := executeSymbolic(component,input);
18          foreach i = 1,...,n do
19              newPC:= c₁ ∧ ...∧ cᵢ₋₁ ∧ -cᵢ;
20              newTest:={test,component,newPC,test.state};
21              enqueue(pcQueue,newTest);
22          {PC₁,component₁} ∧...∧ { PCₘ;componentₘ} :=
                analyzeOutput(output);
23          foreach i=1,...,m do
24              newPC:= c₁ ∧ ... ∧ cₙ ∧ PCᵢ;
25              newTest:={componentⱼ,newPC,newState};
26              if pcQueue does not contain newTest then
27                  enqueue(pcQueue,newTest);
28  return B;
```

FIG. 3

| line(s) | executes | $S_{tar}(l)$ | $S_{map}(l)$ | $S_{comb}(l)$ |
|---|---|---|---|---|
| 4,6,8,9,11 | both | 0.5 | 0.0 | 0.5 |
| 12 | failing only | 1.0 | 0.0 | 1.0 |
| 13 | passing only | 0.0 | 0.0 | 0.0 |
| 14 | passing only | 0.0 | 0.0 | 0.0 |
| 16, 20 | both | 0.5 | 0.0 | 0.5 |
| 21 | failing only | 1.0 | 1.0 | 1.1 |
| 27 | both | 0.5 | 1.0 | 0.5 |
| 28,29 | both | 0.5 | 0.0 | 0.5 |

FIG. 7

| program | version | # files | total LOC | PHP LOC |
|---|---|---|---|---|
| faqforge | 1.3.2 | 19 | 1712 | 734 |
| webchess | 0.9.0 | 24 | 4718 | 2226 |
| schoolmate | 1.5.4 | 63 | 8181 | 4263 |
| phpsysinfo | 2.5.3 | 73 | 16634 | 7745 |
| timeclock | 1.0.3 | 62 | 20792 | 13879 |
| phpBB2 | 2.0.21 | 78 | 34987 | 16993 |

FIG. 8

| program | strategy | %cov | failures | | |
|---|---|---|---|---|---|
| | | | exec. | HTML | total |
| faqforge | No Simulated UI | 86.8 | 9 | 55 | 64 |
| | Simulated UI | 92.4 | 9 | 63 | 72 |
| webchess | No Simulated UI | 37.8 | 20 | 7 | 27 |
| | Simulated UI | 39.4 | 26 | 8 | 34 |
| schoolmate | No Simulated UI | 65.0 | 35 | 60 | 95 |
| | Simulated UI | 65.0 | 35 | 61 | 96 |
| phpsysinfo | No Simulated UI | 55.5 | 3 | 1 | 4 |
| | Simulated UI | 55.7 | 6 | 2 | 8 |
| timeclock | No Simulated UI | 3.2 | 2 | 30 | 32 |
| | Simulated UI | 14.1 | 2 | 117 | 119 |
| phpBB2 | No Simulated UI | 11.4 | 3 | 1 | 4 |
| | Simulated UI | 28.0 | 5 | 19 | 24 |

FIG. 9

| program | failing/passing | *Tarantula* | mapping | combined |
|---|---|---|---|---|
| webchess | All | 19.00 | 25.12 | 6.94 |
| | Random | 24.35 | 25.12 | 7.20 |
| schoolmate | All | 29.94 | 15.06 | 5.09 |
| | Random | 30.21 | 15.06 | 5.10 |
| timeclock | All | 16.09 | 5.12 | 2.24 |
| | Random | 21.54 | 5.12 | 2.41 |

FIG. 10

DETECTING AND LOCALIZING SECURITY VULNERABILITIES IN CLIENT-SERVER APPLICATION

CROSS-REFERENCE TO RELATED APPLICATIONS

This application is based upon and claims priority from prior U.S. patent application Ser. No. 12502519, filed on Jul. 14, 2009, now [pending], the entire disclosure of which is herein incorporated by reference.

STATEMENT REGARDING FEDERALLY SPONSORED RESEARCH

Not Applicable

BACKGROUND

Web applications are typically written in a combination of several programming languages (e.g., JavaScript on the client side, and PHP with embedded SQL commands on the server side), and generate structured output in the form of dynamically generated HTML pages that may refer to additional scripts to be executed. Since the application is built using a complex mixture of different languages, programmers may inadvertently make mistakes and introduce faults in the applications, resulting in web application crashes and malformed dynamically-generated HTML pages that can seriously impact usability.

Moreover, it is difficult to find errors and faults, especially errors and faults that lead to security vulnerabilities in a client-server environment. One reason for this difficulty is that a server application may dynamically generate HTML, JavaScript and other client code that violates information flow.

SUMMARY

Disclosed is an automated detection of information-flow security problems in computer software applications that comprise multiple tiers and in which tiers dynamically generate code that could be executed in different tiers, causing both information and code to flow between tiers. Once a problem has been identified, this invention reports not only where the problem occurred, but also which tier was responsible for generating the faulty code, and which portion of the generating code should be fixed so that the generated code will no longer exhibit that vulnerability. This process is performed with a combination of static and/or dynamic analysis of the code of the various tiers that comprise the application under analysis.

The present invention overcomes many problems associated with automatic fault detection and localization in dynamic web applications. The present invention provides a system, computer program product, on-demand service, and a computer implemented method for analyzing a set of two or more communicating applications. The method includes executing a first application, such as a client application, and executing a second application, such as a server application, wherein the first application and the second application are communicating with each other. The communications can include message passing between the client application and the server application. Also the communications can in response to the server application causing a change in information flow with the client application. In still another embodiment, a portion of the code fragments as part of the first application and/or the second application are dynamically executed and/or statistically analyzed. The first application and the second application are communicating data and/or control with each other.

Static code analysis is the analysis of code fragments as part of an application that is performed without actually executing programs built from that software. The term is usually applied to the analysis performed by an automated tool, with human analysis being called program understanding, program comprehension or code review.

In contrast, analysis performed on executing code fragments is known as dynamic analysis or dynamically executed. Dynamic analysis is the analysis of an application that is performed by executing fragments built from that software system on a real or virtual processor. For dynamic program analysis to be effective, the target program must be executed with sufficient test inputs to produce interesting behavior. Use of software testing techniques such as code coverage helps ensure that an adequate slice of the program's set of possible behaviors has been observed. Also, care must be taken to minimize the effect that instrumentation has on the execution (including temporal properties) of the target program.

A correlation is recorded between the first application and the second application that have been executed and an execution characteristic that the code fragments exhibited on execution. An oracle is used to determine an analysis of the first application that has been executed. The oracle may be used to determine an analysis of the second application as well. In one embodiment, the execution of the first application causes a change of state in the second application and/or a change control flow in the second application. Code fragments in the first application and/or the second application are prioritized based on an evaluation produced by the oracle, and based on the correlation between the code fragments that have been executed and execution characteristics exhibited by these code fragments. In another embodiment, an analysis using a dynamic and/or static oracle of at least a portion of the code fragments that comprise the first application that have been executed.

Various security vulnerabilities and security related information can be analyzed by the oracle. For example, the security related information may include a violation of information flow. Or the security related information includes violation of information flow such as untrusted information flowing into a trusted application. Another type of security information includes private data flowing into a public application.

Also described is a technique that generates additional user inputs based on execution information associated with path constraints and based on information from the oracle. Advantageously, the embodiment is useful in a test generation tool that generated many similar inputs when a failure-inducing input is found in order to enhance fault localization. Further, described is a computer-implemented flow for extending the existing idea of combined concrete and symbolic testing to applications that interact with persistent state.

The present invention leverages two existing techniques—combined concrete and symbolic execution, and the Tarantula algorithm for fault localization—to create a uniquely powerful method for finding and localizing faults. The present invention extends combined concrete and symbolic execution to the domain of dynamic web applications by automatically simulating user interaction. The method automatically discovers inputs required to exercise paths through a program, thus overcoming the limitation of many existing fault localization techniques that a test suite be available upfront. Shown is how the effectiveness of Tarantula can be significantly improved by utilizing a correlation between executed statements and their execution characteristics, in combination with an oracle or that detects where errors occur in the execution characteristics. The present invention is implemented in Apollo, a tool for testing PHP applications, using an HTML validator as our oracle. When applied to a number of opensource PHP applications, Apollo found, and precisely localized, a significant number of faults.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 is an example PHP web application broken into four parts a, b, c, and d.

FIG. 2 is a example HTML produced by the script in part d of FIG. 1 along with output mapping constructed during execution and part of the output of WDG Validator on the HTML.

FIG. 3 is example pseudo-code of the present invention.

FIG. 7 is a table of suspiciousness ratings for lines in section d of the PHP script of FIG. 1 according to the present invention.

FIG. 8 is a table of characteristics of subject programs of the present invention.

FIG. 9 is a table of experimental results for test generation runs of the present invention.

FIG. 10 is a table of average percentage of program a developer would need to inspect for location the failures using the present invention.

DETAILED DESCRIPTION

Figure 4:
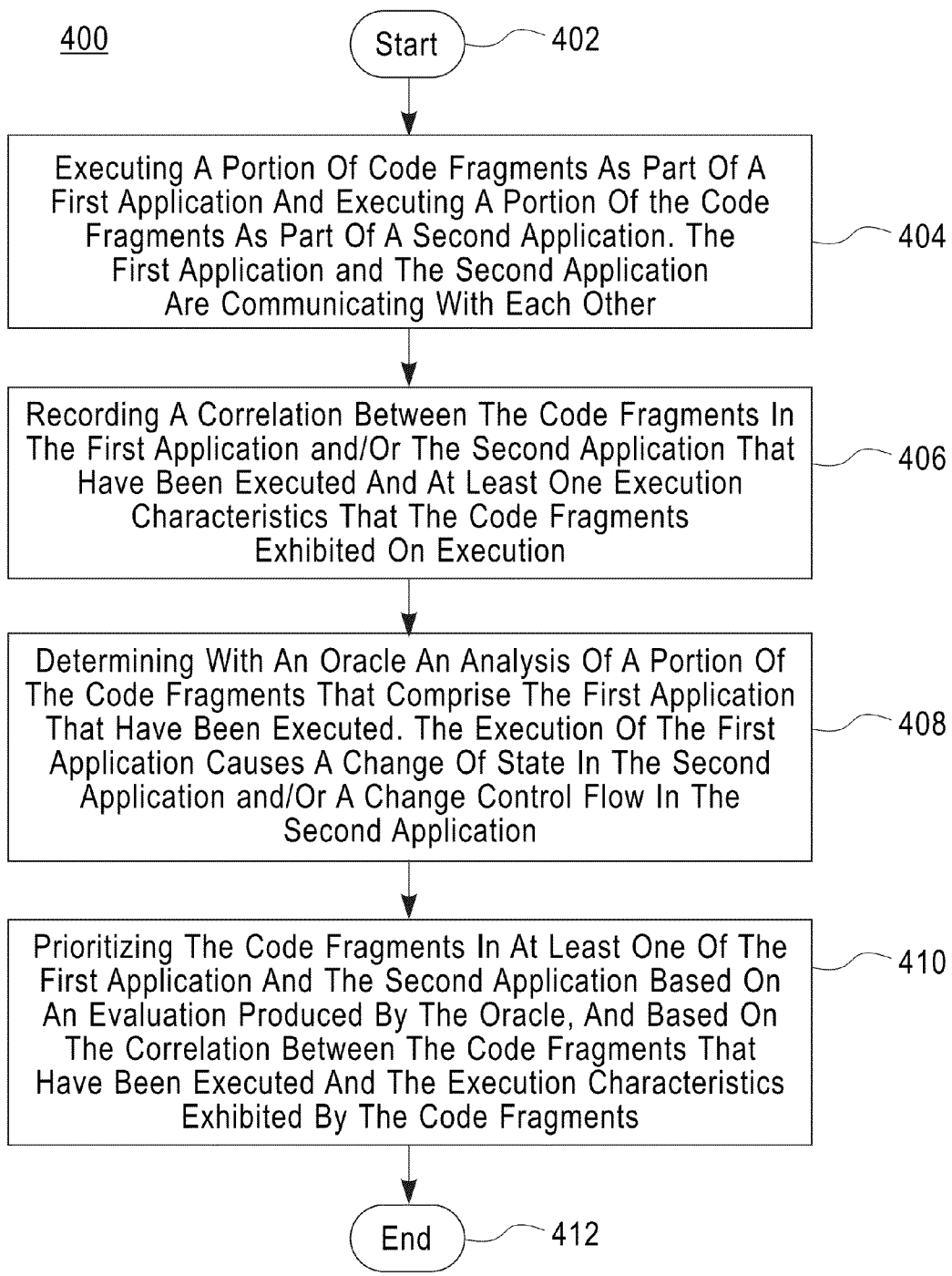
FIGS. 4-6 are example flow diagrams of a computer-implemented method for localizing faults in a client-server architecture of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals, refer to like parts through several views.

Overview of Approach

The present invention is an extension of our previous work and is directed to detecting and localizing security vulnerabilities in client-server software environment such as a violation of information flow, such as untrusted information flowing into a trusted application or private data flowing into a public application.

In our previous work [3], the technique of combined concrete and symbolic execution [4, 7, 8, 19, 22] was adapted to web applications written in PHP. In this approach, the application is first executed on an empty input, and a path condition is recorded that reflects the control flow predicates in the application that have been executed. By changing one of the predicates in the path condition, and solving the resulting condition, additional inputs can be obtained. Execution of the program on these inputs will result in additional control flow paths being exercised. This process is repeated until either there is sufficient coverage of the statements in the application or until the time budget is exhausted. For each execution, a determination is made if an execution error occurs, or if the generated HTML page is malformed, using an HTML validator as an oracle. This technique has been implemented in a tool called Apollo (version 1.0), and in previous experiments on 4 open-source PHP applications, Apollo 1.0 found a total of 214 failures [3].

The coverage achieved by Apollo 1.0 was limited, since Apollo 1.0 ignored changes to the state of the environment by the executed scripts. That is, each script was executed from a single initial environment state (usually a populated database). However, the desired execution characteristics of a PHP application are often only achieved by a series of interactions between the user and the server (e.g., a minimum of five inputs are needed from opening Amazon to buying a book). In the present invention combined concrete and symbolic testing is enhanced by supporting automatic dynamic simulation of user interactions, and implemented in a new version of our tool, Apollo 2.0. Apollo 2.0 records the environment state (database, sessions, cookies) after executing each script, analyzes the output of the script to detect the possible user options that are available, and restores the environment state before executing a new script based on a detected user option.

More importantly, the present invention determines where in the source code changes need to be made in order to fix these failures. This task is commonly referred to as fault localization, and has been studied extensively in the literature (see, e.g., [5, 11-13, 18, 25]). In the present invention the Tarantula fault localization technique by Jones et al. [11,12] is combined with concolic execution in order to perform fully automated failure detection and localization for web applications written in PHP. The Tarantula technique predicts for each statement, how suspicious it is in causing the error. This is calculated from the percentage of passing tests that execute the statement and the percentage of failing tests that execute the statement. From this, a suspiciousness rating is computed for each executed statement. Programmers are encouraged to examine the statements in order of decreasing suspiciousness, and this has been demonstrated to be quite effective in experiments with the Siemens suite [10] of versions of small C programs into which artificial faults have been seeded [11].

The use of combined concrete and symbolic execution to obtain passing and failing runs overcomes the limitation of Tarantula and many other existing fault localization techniques that a test suite with passing and failing runs be available up-front. Furthermore, the fact that PHP applications generate output in a format (HTML) that can be validated using an oracle (an HTML validator) enables us to enhance the effectiveness of fault localization. This is accomplished by maintaining, during program execution, an output mapping from statements in the program to the fragments of output they produce. This mapping, when combined with the report of the oracle that indicates what parts of the program's output are incorrect, provides an additional source of information about the possible location of the fault, and is used to fine-tune the suspiciousness ratings provided by Tarantula.

The contributions of the present invention are as follows:
1. Demonstration that the Tarantula technique, which was previously only evaluated on small programs from the Siemens suite with artificially seeded faults [11, 12], is effective at localizing real faults in commonly used PHP applications.
2. Presentation of an approach for fault localization that leverages combined concrete and symbolic execution and the Tarantula fault localization method. Contrary to most previous methods, ours does not require the availability of a test suite.
3. Implementation of the technique in Apollo 2.0, a fully automated tool for finding faults in PHP applications. This included the design of a new automated technique for the simulation of user input and tracking the usage of persistent state. An experimental evaluation using 6 PHP applications demonstrates that this significantly increased coverage for 6 interactive PHP applications.
4. Apollo 2.0 has been used to localize 49 faults in 3 of the PHP applications and compared the effectiveness of: (i) Tarantula, (ii) a fault localization method that only uses the output mapping, and (iii) a technique that enhances Tarantula using the output mapping. Discovered was that (iii) significantly outperforms (i) and (ii).

Context: PHP and Web Applications

PHP is widely used for implementing Web applications, in part due to its rich library support for network interaction, HTTP processing and database access. A typical PHP web application is a client-server application in which data and control flows interactively between a server that runs PHP scripts and a client, which is usually a web browser. The PHP scripts that run on the server generate HTML that includes forms to invoke other PHP scripts, passing them a combination of user input and constant values taken from the generated HTML.

This section briefly reviews the PHP scripting language, and discusses the kinds of failures that may occur during the execution of a PHP application, focusing on those aspects of PHP that differ from mainstream languages.

The PHP Scripting Language

PHP is object-oriented, in the sense that it has classes, interfaces, and dynamically dispatched methods with syntax and semantics similar to that of Java. PHP also has features of scripting languages, such as dynamic typing, and an eval construct that interprets and executes a string value that was computed at run-time as a code fragment. For example, the following code fragment:

$code="$X=3;"; $x=7; eval($code); echo $x;

prints the value 3 (names of PHP variables start with the $ character). Other examples of the dynamic nature of PHP are a predicate that checks whether a variable has been defined, and class and function definitions that are statements that may occur anywhere.

The code in FIGS. 1(b), 1(c) and 1(d) illustrates the flavor of PHP. Note first of all that the code is an ad-hoc mixture of PHP statements and HTML fragments. The PHP code is delimited by <?php and ?> tokens. The use of HTML in the middle of PHP indicates that HTML is generated as if it were in a print statement. The require statements resemble the C #include directive in the sense that it includes the code from another source file. However, the C version is a pre-processor directive with a constant argument, whereas the PHP version is an ordinary statement in which the file name is computed at runtime. Observe that the dirname function—which returns the directory component of a filename—is used in the require statements, as an example of including a file whose name is computed at run-time. There are many similar cases where run-time values are used, e.g., switch labels need not be constant. This degree of flexibility is prized by PHP developers for enabling rapid application prototyping and development. However, the flexibility can make the overall structure of program hard to discern and it can make programs prone to code quality problems.

Failures in PHP Programs

In one embodiment, the present invention provides a technique that targets two types of failures that may occur during the execution of PHP applications and that can be automatically detected:

Execution failures are caused by missing included files, incorrect MySQL queries, and uncaught exceptions. Such failures are easily identified as the PHP interpreter generates an error message and halts execution. Less serious execution failures, such as those caused by the use of deprecated language constructs produce obtrusive error messages but do not halt execution.

HTML failures involve situations in which the generated HTML page is not syntactically correct according to an HTML validator. This may result in pages being rendered incorrectly in a browser, it may cause portability problems, and the resulting pages may render slower when browsers attempt to compensate for the malformedness.

Fault Localization

Detecting failures only demonstrates that a fault exists; the next step is to find the location of the fault that causes each failure. There are at least two pieces of information that might help:

1. For HTML failures, validators provide locations in the HTML file that have problems, and one could correlate malformed HTML fragments with the portions of the scripts that produced them.
2. For both kinds of failures, one could look at runs that do not exhibit the error, and record what set of statements such runs execute. Comparing that set of statements with the set of statements executed by the failing run could provide clues as to the fault location. The extensive literature on fault localization algorithms that exploit such information is discussed in the section "Related Work".

PHP Example

FIG. 1 shows an example of a PHP application that is designed to illustrate the particular complexities of finding and localizing faults in PHP web applications. In particular, the figure shows: an index.php top-level script that contains static HTML in FIG. 1(a), a generic login script login.php in FIG. 1(c), and a skeleton of a data display script view.php in FIG. 1(d). The two PHP scripts rely on a shared include file constants.php that defines some standard constants, which is shown in FIG. 1(b).

These fragments are part of the client-server work flow in a Web application: the user first sees the index.php page of FIG. 1(a) and enters credentials. The user-input credentials are processed by the script in FIG. 1(c), which generates a response page that allows the user to enter further input—a topic—that in turn generates further processing by the script in FIG. 1(d). Note that the user name and password that are entered by the user during the execution of login.php are stored in special locations $_SESSION [$userTag] and $_SESSION [$pwTag], respectively. Moreover, if the user is the administrator, this fact is recorded similarly, in $_SESSION [$typeTag]. These locations illustrate how PHP handles session state, which is data that persists from one page to another, typically for a particular interaction by a particular user. Thus, the updates to _SESSION in FIG. 1(c) will be seen by the code in FIG. 1(d) when the user follows the link to view.php in the HTML page that is returned by login.

php. The view.php script uses this session information to verify the username/password in line 5.

The example program contains an error in the HTML produced for the administrative details: the H2 tag that is opened on line 21 of FIG. 1(d) is not closed. While this fault itself is trivial, finding it and localizing its cause is not. Assume that testing starts (as an ordinary user would) by entering credentials to the script in FIG. 1(c). A tester must then discover that setting $user to the value 'admin' results in the selection of a different branch that records the user type 'admin' in the session state (see lines 20-22 in login.php). After that, a tester would have to enter a topic in the form generated by the login script, and would then proceed to FIG. 1(d) with the appropriate session state, which will finally generate HTML exhibiting the fault as is shown in FIG. 2(a). Thus, finding the fault requires a careful selection of inputs to a series of interactive scripts, and tracking updates to session state during the execution of these scripts.

The next step is to determine the cause of the malformed HTML. Consider the two sources of information suggested in the section "Fault Localization":

The validator produces the output shown in FIG. 2(c) for this fault, indicating that lines 5 and 6 in the malformed HTML of FIG. 2(a) are associated with the HTML failure. These lines correspond to the H2 heading and the following /BODY tags, respectively. By correlating this information with the output mapping shown in FIG. 2(b), lines 21 and 27 can be determined in view.php produced these lines of output.

The second source of information is obtained by comparing the statements executed in passing and failing runs. The HTML failure only occurs when $type is equal to 'admin', and the difference between passing and failing runs therefore consists of all code that is guarded by the two conditionals on lines 11 and 20 in view.php. Consequently, it may be concluded that the statements on lines 12, 14, and 21 are suspect.

Neither of these estimates is precise, since the fault is clearly in the printing of the H2 line itself (line 21). Combining, however, the results of the validator and the sets of statements. Specifically, observing that the printing of /BODY on line 27 in view.php occurs in both passing and failing executions, and is therefore unlikely to be the location of the fault. Furthermore, observing that lines 12 and 14, each of which is only executed in one of the executions, is not associated with the failure according to the information received from the oracle or code-validator. Therefore, it can be concluded that the fault is most closely associated with line 21 in view.php.

Combined Concrete and Symbolic Execution in the Presence of Interactive User Input The technique of the present invention for finding failures in PHP applications is a variation on combined concrete and symbolic execution [4, 7, 8, 19, 22], a well-established test generation technique. The basic idea behind this technique is to execute an application on some initial (e.g., empty or randomly chosen) input, and then on additional inputs obtained by solving constraints derived from exercised control flow paths. Failures that occur during these executions are reported to the user.

In our previous paper [3], described is how this technique can be adapted to the domain of dynamic web applications written in PHP. The resulting Apollo 2.0 tool takes into account language constructs that are specific to PHP, uses an oracle to validate the output, and supports database interaction. However, prior art solutions relied on a manual solution for the challenging problem of interactive user input already described in the section "PHP and Web Applications". PHP applications typically generate HTML pages that contain user-interface features such as buttons that—when selected by the user—result in the execution of additional PHP scripts. Modeling such user input is important, because coverage of the application will typically remain very low otherwise. In our previous paper [3], a manually performed program transformation was used that translates interactive user input into additional script parameters. This manual step had several limitations:

It was performed only once before the analysis, and thus did not take into account user input options that are created dynamically by the web application.

More importantly, while Apollo 1.0 was able to execute additional parts of the program, it did so without any knowledge of parameters that are transferred from one executable component to the next by persisting them in the environment, or sending them as part of the call.

The present invention, replaces this manual step with an automatic method that (i) tracks changes to the state of the environment (i.e., session state, cookies, and the database) and (ii) performs an "on the fly" analysis of the HTML output produced by PHP scripts to determine what user options it contains, with their associated PHP scripts. By determining the state of the environment as it exists when an HTML page is produced, the environment in which additional scripts are executed as a result of user interaction is determined.

This is important because a script is much more likely to perform complex execution characteristics when executed in the correct context (environment). For example, if the web application does not record in the environment that a user is logged in, most scripts will present only vanilla information and terminate quickly (e.g., when the condition in line 5 of FIG. 1(d) is false). The new automated approach has increased coverage and the number of faults found, and it is within the true scope and spirit of the present invention that it could be utilized in other tools as well (e.g., in the context of the work by Wassermann et al. [22], who use combined concrete and symbolic execution to find SQL injection vulnerabilities in PHP applications).

Algorithm

FIG. 3 shows pseudo-code for the failure detection algorithm, which extends the algorithm of Apollo 1.0[3] by tracking the state of the environment, and automatically discovering additional scripts based on an analysis of available user options. As an overview, FIG. 3 illustrates how the solve auxiliary function uses the constraint solver to find an input satisfying the path constraint, or returns ⊥ if no satisfying input exists. The auxiliary functions restoreState and getCurrentState create a given environment state, or load the current state of the environment respectively. The analyzeOutput auxiliary function performs an analysis of the output to extract possible transitions from the current environment state. The output of the algorithm is a set of bug reports, each reports a failure and the set of tests exposing that failure.

More specifically, in FIG. 3, the inputs to the algorithm are: a program P composed of any number of executable components (PHP scripts), the initial state of the environment before executing any component (e.g., database), a set of executable components reachable from the initial state C, and an output oracle O. The output of the algorithm is a set of bug reports B for the program P, according to O. Each bug report contains the identifying information about the failure (message, and generating program part), and the set of tests exposing the failure.

The algorithm uses a queue of tests. Each test contains the program component to execute, a path constraint which is a conjunction of conditions on the program's input parameters, and the environment state before the execution. The queue is initialized with one test for each of the components executable from the initial state, and the empty path constraint (lines 3-5). The algorithm uses a constraint solver to find a concrete input that satisfies a path constraint from the selected test (lines 7-9). The algorithm restores the environment state (line 11), then executes the program component concretely on the input and checks if failures occurred (lines 12-14). Any detected failure is merged into the corresponding bug report (lines 15-16). Next, the program is executed symbolically on the same input (line 17). The result of symbolic execution is a path constraint, $\hat{}_{i=1}^n c_i$, that is fulfilled if the given path is executed (here, the path constraint reflects the path that was just executed). The algorithm then creates new test inputs by solving modified versions of the path constraint (lines 18-21) as follows. For each prefix of the path constraint, the algorithm negates the last conjunct (line 19). A solution, if it exists, to such an alternative path constraint corresponds to an input that will execute the program along a prefix of the original execution path, and then take the opposite branch. Finally, the algorithm analyzes the output to find new transitions from the new environment state (line 22). Each transition is expressed as a pair of path constraints and an executable component. The algorithm then adds new tests for each transition that was not explored before (line 23-27).

Algorithm Example

Illustrated now is the algorithm of FIG. 3 using the example application of FIG. 1. The inputs to the algorithm are: P is the code from FIG. 1, the initial state of the environment is empty, C is the script in FIG. 1(c), and O is the WDG HTML validator. (For more information see http://htmlhelp.com/tools/validator/) The algorithm begins on lines 3-5 by initializing the work queue with one item: the script of FIG. 1(a) with an empty path constraint and an empty initial environment.

Iteration 1. The First Iteration of the Outer Loop (Lines 6-27)

removes that item from the queue (line 7), uses an empty input to satisfy the empty path constraint (line 9), restores the empty initial state (line 11), and executes the script (line 12).

No failures are observed, so the next few lines (line 13-16) do nothing. The call to executeSymbolic on line 17 returns an empty path constraint, so the function analyzeOutput on line 22 is executed next, and returns one user option; (login.php, ∅,∅) for executing login.php with no input, and the empty state. This test is added to the queue (line 27).

iteration 2-5. The next iteration of the top-level loop dequeues the new work item, and executes login.php with empty input, and empty state. No failures are found. The call to executeSymbolic in line 17 returns a path constraint user≠admin ˆuser≠reg, indicating that the call to check_password on line 8 in FIG. 1(c) returned false. For simplicity, the details of this function have been omitted because it is understood by those of average skill in the programming art. It compares user and password to some constraints 'admin" and 'reg'.

Given this, the loop at lines 18-21 will generate several new work items for the same script with the following path constraints user≠admin ˆuser≠reg, and user=admin which are obtained by negating the previous path constraint. The loop on lines 23-27 is not entered, because no user input options are found. After several similar iterations, two inputs are discovered: user=admin ˆpw=admin, and user≠regˆpw=reg. These correspond to alternate control flows in which the check_password test succeeds.

iteration 6-7. The next iteration of the top-level loop dequeues an item that allows the check_password call to succeed (assume it selected user=reg . . . ). Once again, no failures are observed, but now the session state with user and pw set is recorded at line 13. Also, this time analyzeOutput (line 22) finds the link to the script in FIG. 1(d), and so the loop at line 23-27 adds one item to the queue, executing view.php with the current session state.

The next iteration of the top-level loop dequeues one work item. Assume that it takes the last one described above. Thus, it executes the script in FIG. 1(d) with a session that defines user and pw but not type. Hence, it produces an execution with no errors.

iteration 8-9. The next loop iteration takes that last work item, containing a user and password pair for which the call to check.password succeeds, with the user name as 'admin'. Once again, no failures occur, but now the session state with user, pw and type set is recorded at line 13. This time, there are no new inputs to be derived from the path constraint, since all prefixes have been covered already. Once again, parsing the output finds the link to the script in FIG. 1(d) and adds a work item to the queue, but with a different session state (in this case, the session state also includes a value for type). The resulting execution of the script in FIG. 1(d) with the session state that includes type results in an HTML failure.

There are a few other things that happen, but at this point it should be noted that one successful and one failing execution for the script in FIG. 1(d) has been observed. This will discuss in the section "Fault Localization Example" how this information will be used for fault localization.

Fault Localization

In this section, reviewed first is the Tarantula fault localization technique. Next, an alternative technique is presented that is based on the output mapping and positional information obtained from an oracle. Finally, presented is a technique that combines the former with the latter.

Tarantula

Jones et al. [11, 12] presented Tarantula, a fault localization technique that associates with each statement a suspiciousness rating that indicates the likelihood that it contributes to a failure. Note line numbers are used to identify statements, because that enables us to present the different fault localization techniques in a uniform manner. The suspiciousness rating $S_{tar}(l)$ for a statement that occurs at line[3] l is a number between 0 and 1 that is defined as follows:

$$S_{tar(l)} = \frac{\text{Failed}(l)TotalFailed}{\text{Passed}(l)/TotalPassed + \text{Failed}(l)/TotalFailed}$$

where Passed(l) is the number of passing executions that execute statement l, Failed(l) is the number of failing executions that execute statement l, TotalPassed is the total number of passing test cases, and TotalFailed is the total number of failing test cases. After suspiciousness ratings have been computed, each of the executed statements is assigned a rank, in order of decreasing suspiciousness. Ranks do not need to be unique: The rank of a statement l reflects the maximum number of statements that would have to be examined if statements are examined in order of decreasing suspiciousness, and if l were the last statement of that particular suspiciousness level chosen for examination.

Jones and Harrold [11] conducted a detailed empirical evaluation in which they apply Tarantula to faulty versions of the Siemens suite [10], and compare its effectiveness to that of several other fault localization techniques (see the section "Related Work"). The Siemens suite consists of several versions of small C programs into which faults have been seeded artificially. Since the location of these faults is given, one can evaluate the effectiveness of a fault localization technique by measuring its ability to identify these faults. In the fault localization literature, this is customarily done by reporting the percentage of the program that needs to be examined by the programmer, assuming statements are inspected in decreasing order of suspiciousness [1, 5, 11, 18].

Specifically, Jones and Harrold compute for each failing test run a score (in the range of 0%-100%) that indicates the percentage of the application's executable statements that the programmer need not examine in order to find the fault. This score is computed by determining a set of examined statements that initially contains only the statement(s) at rank 1. Then, iteratively, statements at the next higher rank are added to this set until at least one of the faulty statements is included. The score is now computed by dividing the number of statements in the set by the total number of executed statements. Using this approach, Jones and Harrold found that 13.9% of the failing test runs were scored in the 99-100% range, meaning that for this percentage of the failing tests, the programmer needs to examine less than 1% of the program's executed statements to find the fault. They also report that for an additional 41.8% of the failing tests, the programmer needs to inspect less than 10% of the executed statements.

Fault Localization Using the Output Mapping

An oracle that determines whether or not a failure occurs can often provide precise information about which parts of the output are associated with that failure. For instance, an HTML validator will typically report the location of malformed HTML. Such information can be used as a heuristic to localize faults in the program, provided that it can be determine which portions of the program produced which portions of the output. The basic idea is that the code that produced the erroneous output is a good place to start looking for the causative fault. This is formalized as follows. Assume the following two functions:

$O_n$ (f) returns output line numbers reported by the oracle O for failure f, and $P_n$(o) returns the set of program parts of the source program responsible for output line o Given these two functions, a suspiciousness rating $S_{map}(l)$ of the statement at line l for failure f is defined as follows:

$$S_{map}(l) = \begin{cases} 1 & \text{if } l \in \bigcup_{o \in O_n(f)} P_n(o) \\ 0 & \text{otherwise} \end{cases}$$

Note that this is a "binary" rating: program parts are either highly suspicious, or not suspicious at all.

Combined Technique

The algorithm presented in the section "Tarantula" localizes failures based on how often statements are executed in failing and passing executions. However, in the web applications domain, a significant number of lines are executed in both cases, or only in failing executions. Thus, the fault localization technique presented in the section "Fault Localization using the Output Mapping" can be used to enhance the Tarantula results by giving a higher rank to statements that are blamed by both Tarantula and the mapping technique. More formally, a new suspiciousness rating $S_{comb}(l)$ for the statement at line l is defined as follows:

$$S_{comb}(l) = \begin{cases} 1.1 & \text{if } S_{map}(l) = 1 \land S_{tar}(l) > 0.5 \\ S_{tar}(S) & \text{otherwise} \end{cases}$$

Informally, given the suspiciousness rating 1.1 to any statement that is identified as highly suspicious by the oracle, and for which Tarantula indicates that the given line is positively correlated with the fault (indicated by the fact that Tarantula's suspiciousness rating is greater than 0.5).

Generating Inputs for Tarantula

As discussed previously, Tarantula computes suspiciousness ratings using a formula that considers how many times a statement is executed by passing and failing executions. But which passing executions and failing executions should be supplied as inputs to Tarantula?

To answer this question, assume that the algorithm of the section "Combined concrete and symbolic Execution in the Present of Interactive User Input" has exposed a number of failing executions. This set can be partitioned into subsets that pertain to the same failure. Here, two failures are assumed to be "equivalent" (i.e., due to the same fault) if the oracle produces the same message for them, and if the same program constructs are correlated with these messages according to the output mapping. In the section "Evaluation", separate fault localization are conducted for experiments for each subset of equivalent failing executions.

This leaves the question of what set of passing executions should be supplied to Tarantula as inputs along with these failing executions. Currently two options are considered:

1. Supply all passing executions that were identified by the algorithm of the section "Combined concrete and symbolic Execution in the Present of Interactive User Input."

2. Supply a randomly selected subset of 10% of the passing tests that were identified by the algorithm of the section "Combined concrete and symbolic Execution in the Present of Interactive User Input".

Note that the above strategies can be applied to both the Tarantula and the combined algorithms.

Example

Figure 5:
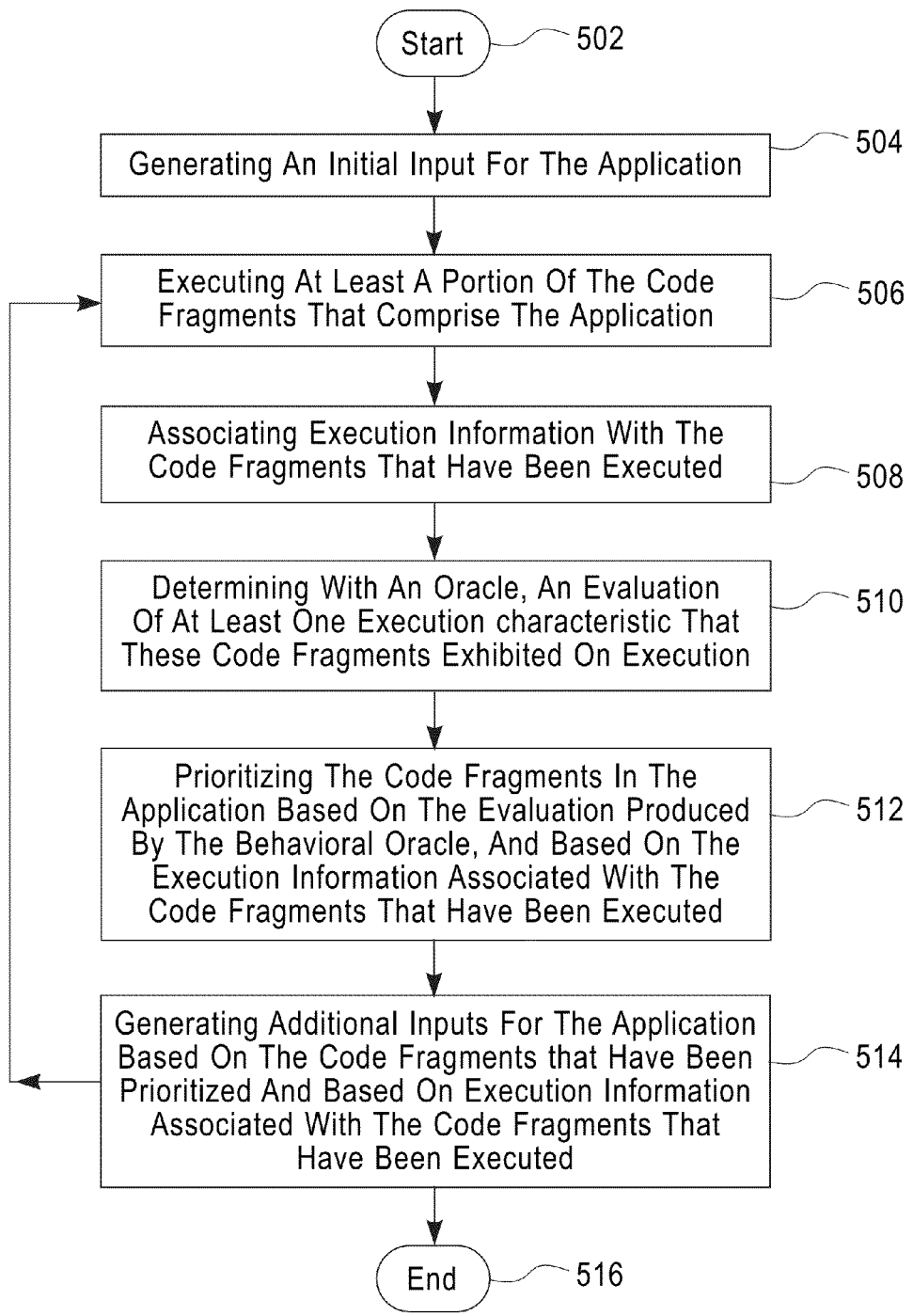

As described in the section "Example Algorithm", the test input generation algorithm produced two runs of the script in FIG. 1(d): one that exposed an HTML error and one that did not. FIG. 5 shows the suspiciousness ratings $S_{tar}(l)$, $S_{map}(l)$, and $S_{comb}(l)$ that are computed for each line l in the PHP script in FIG. 1(d), according to the three fault localization techniques under consideration. The columns of the table show, for each line 1, when it is executed (in the passing run, in the failing run, or in both runs), and the suspiciousness ratings $S_{tar}(l)$, $S_{map}(l)$, and $S_{comb}(l)$.

To understand how the Tarantula ratings are computed, consider statements that are only executed in the passing run. Such statements obtain a suspiciousness rating of 0/(1+0)=0.0. By similar reasoning, statements that are only executed in the failing run obtain a suspiciousness rating of 1/(0+1)=1.0, and statements that are executed in both cases obtain a suspiciousness rating of 1/(1+1)=0.5.

The suspiciousness ratings computed by the mapping based technique can be understood by examining the output of the validator in FIG. 2(c), along with the HTML in FIG. 2(a) and the mapping from lines of HTML to the lines of PHP that produced them in FIG. 2(b). The validator says the error is in line 5 or 6 of the output, and those were produced by lines 21 and 27 in the script of FIG. 1(d). Consequently, the suspiciousness ratings for lines 21 and 27 is 1.0, and all other lines are rated 0.0 by the mapping-based technique.

The suspiciousness ratings for the combined technique follow directly from its definition in the section entitled "Combined Technique".

As can be seen from the table, the Tarantula technique identifies lines 12 and 21 as the most suspicious ones, and the output mapping based technique identifies lines 21 and 27 as such. In other words, each of these fault localization techniques—when used in isolation—reports one nonfaulty statement as being highly suspicious. However, the combined technique correctly identifies only line 21 as the faulty statement.

Example Flow Diagrams

Figure 6:
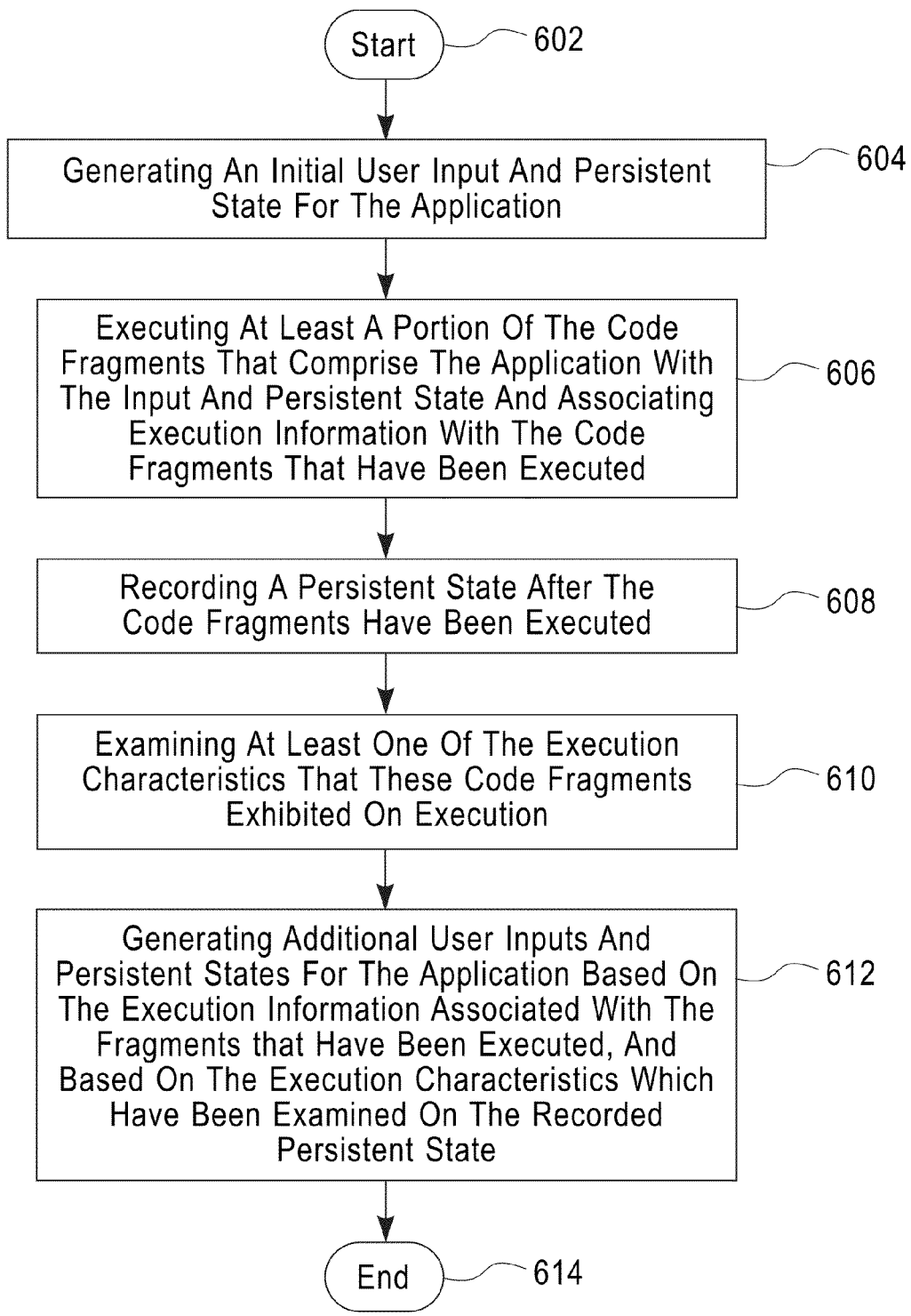

FIGS. 4-6 are example flows of a computer-implemented method for localizing faults in client-server operating environment according to the present invention.

Turning now to FIG. 4, shown is a computer-implemented flow of an embodiment for prioritizing code fragments based on the use of a software oracle and on a correlation between the executed code fragments and the output they produce. The term "oracle" as used herein is a software algorithm that evaluates execution characteristics of code fragments.

In FIG. 4, the process begins at step 402 and immediately proceeds to step 404, where the code fragments as part of a first application and the code fragments as part of a second application are executed. The first application and the second application are communicating with each other. In one embodiment, the communication between the first application and the second application is via message passing. In another embodiment, the execution of the second application, such as a server application, causes a flow of information between the first and second application. An example of the flow of information is the execution of the first application causes a change of state in the second application. Another example of the flow of information is a change in control flow in the second application. In still another embodiment, a portion of the code fragments as part of the first application and/or the second application are dynamically executed and/or statistically analyzed. The first application and the second application are communicating data and/or control with each other. The first application and the second application can be part of an N-tiered distributed program as further described further. Next in step 406, a correlation is recorded between the code fragments in the first application and/or the second application and at least one execution characteristic exhibited on execution. In step 408, a determination with an oracle is performed. The oracle produces an analysis of the code fragments that comprise the first application that have been executed. In another embodiment, the oracle produces an analysis of the code fragments that comprise the second application that have been executed as well. In another embodiment, an analysis using a dynamic and/or static oracle of at least a portion of the code fragments that comprise the first application that have been executed.

In step 410, the code fragments in the first application and/or the second application are prioritized in the application based on the evaluation produced by the oracle, and based on the correlation between the executed code fragments and the execution characteristics exhibited by those code fragments and the process ends at step 412.

In another embodiment, the evaluation produced by the oracle corresponds to security vulnerabilities in the generated application. Various security vulnerabilities and security related information can be analyzed by the oracle. For example, the security information may include a violation of information flow. For example, a violation of information flow is untrusted information flowing into a trusted application. Another example of a violation of information flow is private data flowing into a public application.

In one embodiment, the evaluation produced by the oracle is a fault localization evaluation. In another embodiment, the execution characteristics exhibited by the executed code fragments is an output of the application, and the evaluation produced by the oracle corresponds to errors in at least one part of this output. The execution characteristics in another embodiment is a creation of at least one new generated application. Still, in another embodiment, the execution characteristics include a characteristic of performance of the code fragments. Further, in one embodiment, the evaluation produced by the oracle corresponds to errors in the generated application.

Further, in one embodiment, the execution characteristics of the executed code fragments is an output of the application, and the evaluation produced by the oracle corresponds to errors in at least one part of this output. The execution characteristics in another embodiment is a creation of at least one new generated application. Still, in another embodiment, the execution characteristics of the executed code fragments is a characteristic of performance of the code fragments. Further, in one embodiment, the evaluation produced by the oracle corresponds to errors in the generated application. And in another embodiment, the evaluation produced by the oracle corresponds to security vulnerabilities in the generated application.

Turning now to FIG. 5, shown is a computer-implemented flow of an embodiment for generating additional user inputs based on execution information associated with path constraints and based on information from the oracle. Advantageously, the embodiment is useful in a test generation tool that generated many similar inputs when a failure-inducing input is found, in order to enhance fault localization.

In FIG. 5, the process begins at step 502 and immediately proceeds to step 504 where an initial user input is generated for the application. Next, in step 506, at least a portion of the code fragments that comprise the application is executed. In step 508, execution information is associated with the executed code fragments. In step 510, an oracle is used to provide an evaluation of at least one execution characteristics that these code fragments exhibited on execution. Code fragments in the application are prioritized based on the evaluation produced by the oracle, and based on the execution information associated with the executed code fragments in step 512. Additional inputs for the application are generated based on the code fragments that have been prioritized and based on execution information associated with the executed code fragments in step 514. And the process may continue back to step 506 until all the desired code fragments are analyzed and end in step 516.

In one embodiment, the execution characteristics of the executed code fragments is an output of the application, and the evaluation produced by the oracle corresponds to errors in at least one part of this output. In another embodiment, execution characteristics of the executed code fragments is a characteristic of performance of the executed code fragments. Moreover, in another embodiment, the execution information associated with code fragments that have been executed consists of path constraints. In still another embodiment, the execution characteristics of the executed code fragments is a creation of at least one new generated application. Further, the evaluation produced by the oracle corresponds to errors in the generated application. Still, further, in another embodiment, the evaluation produced by the oracle corresponds to security vulnerabilities in the generated application.

Turning now to FIG. 6, shown is a computer-implemented flow diagram of an embodiment for extending the existing idea of combined concrete and symbolic testing to applications that interact with persistent state. Unlike the flow diagrams of FIGS. 4 and 5, no oracle is required in this flow.

In FIG. 6, the process begins at step 602 and immediately proceeds to step 604 where an initial input and persistent state for the application is generated. Next, in step 606, at least a portion of the code fragments that comprise the application is executed with the input and persistent state. Execution information is associated with the execution of the code fragments. In step 608, usage of persistent state by the executed code fragments is recorded. At least one execution characteristics is examined that these code fragments exhibited on execution, in step 610. Additional user inputs for the application are generated for the application based on the execution information associated with the fragments that have been executed, and based on the execution characteristics which have been examined, and based on the recorded persistent state in step 612, and the flow ends in step 614.

In another embodiment, the execution information associated with code fragments that have been executed consists of path constraints. In another embodiment, the examining of the execution characteristics of the executed code fragments is a creation of at least one new generated application, and where the examining of the execution characteristics involves performing a program analysis to detect security vulnerabilities in this generated application.

Implementation

The Apollo 1.0 tool [3] has been extended with the algorithm for combined concrete and symbolic execution in the presence of interactive user input and persistent session state that was presented in the section "Combined concrete and symbolic Execution in the Presence of Interactive User Input", and with the fault localization algorithm that was presented in the section "Fault Localization". This section discusses some key features of the implementation.

interactive user input and session state. As was mentioned in the section "Combined concrete and symbolic Execution in the Presence of Interactive User Input", it is important to determine what PHP scripts the user may invoke by selecting buttons, checkboxes, etc. in the HTML output of previously executed scripts. To this end, Apollo 2.0 automatically extracts the available user options from the HTML output. Each option contains the script to execute, along with any parameters (with default value if supplied) for that script. Apollo 2.0 also analyzes recursive static HTML documents that can be called from the dynamic HTML output, i.e. Apollo 2.0 traverses hyperlinks in the generated dynamic HTML that link to other HTML documents on the same site. To avoid redundant exploration of similar executions, Apollo 2.0 perform state matching (performed implicitly in Line 26 of FIG. 3) by not adding already-explored transitions.

The use of session state allows a PHP application to store user supplied information on the server for retrieval by other scripts. The PHP interpreter has been enhanced to record when input parameters are stored in session state, to enable Apollo 2.0 to track constraints on input parameters in all scripts that use them.

web server integration. Apollo 1.0[3] only supported the execution of PHP scripts using the PHP command line interpreter. However, dynamic web applications often depend on information supplied by a web-server, and some PHP constructs are simply ignored by the command line interpreter (e.g., header). Apollo 2.0 supports execution through the Apache web-server in addition to the stand-alone command line executor. A developer can use Apollo 2.0 to silently analyze the execution and record any failure found while manually using the subject program on an Apache server.

Evaluation

This evaluation aims to answer two questions:

Q1. What is the effect of automatically simulating user input interaction on coverage and on the number of failures exposed?

Q2. How effective are the three fault localization techniques presented in the section "Fault Localization" in practice?

Subject Programs

For the evaluation, six open-source PHP programs (from http://sourceforge.net) have been selected, for which the characteristics are shown in FIG. 8. faqforge is a tool for creating and managing documents. webchess is an online chess game. schoolmate is an PHP/MySQL solution for administering elementary, middle, and high schools. Phpsysinfo displays system information, e.g., uptime, CPU, memory, etc. timeclock is a web-based timeclock system. phpBB2 is an open source discussion forum.

Coverage/Failures Detected

Apollo was run with and without the simulation of user interaction for 10 minutes on each subject program. This time limit was chosen arbitrarily, but it allows each strategy to generate hundreds of inputs and there is no reason to program believe that the results would be much affected by a different time limit. This time budget includes all experimental tasks. Line coverage was measured, i.e., the ratio of the number of executed lines to the total number of lines with executable PHP code that was shown in FIG. 8. Furthermore, the discovered failures were classified as execution failures and HTML failures, as was discussed previously in the section "Failures in PHP Programs".

FIG. 9 tabulates the line coverage results and observed failures on the subject programs for each of the two test input generation strategies (with simulated user interaction and without). As shown in FIG. 9, the Experimental results are for 10-minute test generation runs. The table presents results each of the No Simulated UI and the Simulated UI strategies. The % cov column lists the line coverage achieved by the generated inputs. The next three columns show the number of execution errors, HTML failures, and the total number of failures.

Although the effect varies, it is clear that the user input simulation allows Apollo to achieve better results on all subject programs. For example, on phpsysinfo the effect on coverage is marginal (55.7% vs. 55.5%) because this program is not interactive. On the other hand, for phpBB2 the effect is significant for both the coverage obtained (28.0% vs. 11.4%), and for the number of failures detected (24 instead of 4), and similarly for timeclock because these applications only performs most operations when starting in the correct state (e.g., when the user is logged in).

Localizing Faults

To answer the second research question, localized faults database was created by manually localizing up to 20 faults in 3 of the subject programs (webchess contained only 9 faults that caused the 34 failures reported previously). The three fault localization methods were applied that were discussed in the section "Fault Localization" to each failure f: (i) one implementation of Tarantula (see the section "Tarantula"), (ii) a fault localization technique that uses only the output mapping (see the section "Fault Localization using the Output Mapping"), and (iii) a fault localization technique that combines Tarantula with the output mapping (see the section "Combined Technique"). As mentioned in the section "Generating Inputs", two sets of inputs were tried for each technique: (a) the set of executions exposing fin combination with all passing executions, and (b) the set of executions exposing fin combination with 10% of randomly selected passing executions.

The effectiveness was measured of these fault localization algorithms as the minimal number of statements that need to be inspected until all the faulty lines are detected, assuming that statements are examined in order of decreasing suspiciousness (See the section "Tarantula"). FIG. 10 tabulates the results. As shown in FIG. 10, the average percentage of the program a developer would need to inspect in order to locate the failures using different fault localization techniques. The failing/passing column indicates the method that was used to select the sets of passing and failing tests (one of All, Random) used for the fault localization. Tarantula is the fault localization technique described in the section "Tarantula" mapping is the fault localization based only on the output mapping (see the section "Fault Localization using the Output Mapping"). combined is the combined fault localization technique described in the section "Combined Technique".

The results show that the combined technique is clearly superior to each of the Tarantula and mapping-based techniques that it builds upon. For webchess, the programmer would need to inspect 19.00% of the statements on average when Tarantula is supplied with all passing executions, 25.12% when the mapping-based technique is used, but only 6.94% using the combined technique. Using the same set of executions, the programmer needs to inspect 29.94% of schoolmate's statements using Tarantula, 15.06% using the output mapping, and only 5.09% using the combined technique. Similar results are obtained for timeclock. The use of a randomly selected subset of the passing tests yields slightly worse results for each of the techniques.

Related Work

This section discusses three categories of related work: (i) combined concrete and symbolic execution, (ii) testing of web applications, and (iii) fault localization.

DART [7] is a tool for finding combinations of input values and environment settings for C programs that trigger errors such as assertion failures, crashes and non-termination. DART combines random test generation with symbolic reasoning to keep track of constraints for executed control-flow paths. A constraint solver directs subsequent executions towards uncovered branches. CUTE [19] is a variation (called combined concrete and symbolic (concolic) testing) on the DART approach. The authors of CUTE introduce a notion of approximate pointer constraints to enable reasoning over memory graphs and handle programs that use pointer arithmetic.

Subsequent work extends the original approach of combining concrete and symbolic executions to accomplish two primary goals: 1) improving scalability [26], [28], [31], [32], [8], [35], and 2) improving execution coverage and fault detection capability through better support for pointers and arrays [4], [19], better search heuristics [8], [33], [34], or by encompassing wider domains such as database applications [30].

Godefroid [31] proposed a compositional approach to improve the scalability of DART. In this approach, summaries of lower level functions are computed dynamically when these functions are first encountered. The summaries are expressed as pre- and post-conditions of the function in terms of its inputs. Subsequent invocations of these lower level functions reuse the summary. Anand et al. [26] extend this compositional approach to be demand-driven to reduce the summary computation effort.

Exploiting the structure of the program input may improve scalability [32], [35]. Majumdar and Xu [35] abstract context free grammars that represent the program inputs to produce a symbolic grammar. This grammar reduces the number of input strings to enumerate during test generation.

Majumdar and Sen [34] describe hybrid combined concrete and symbolic testing, which interleaves random testing with bounded exhaustive symbolic exploration to achieve better coverage. Inkumsah and Xie [33] combine evolutionary testing using genetic mutations with combined concrete and symbolic testing to produce longer sequences of test inputs. SAGE [8] also uses improved heuristics, called whitebox fuzzing, to achieve higher branch coverage The PHP language that we used as example in this invention is quite different from the focus of previous testing research. PHP poses several new challenges such as dynamic inclusion of files, and function definitions that are statements. Existing techniques for fault detection in PHP applications use static analysis and target security vulnerabilities such as SQL injection or cross-site scripting (XSS) attacks [40], [42], [45], [50], [51]. In particular, Minamide [45] uses static string analysis and language transducers to model PHP string operations to generate potential HTML output—represented by a context free grammar—from the web application. This method can be used to generate HTML document instances of the resulting grammar and to validate them using an existing HTML validator. As a more complete alternative, Minamide proposes a matching validation which checks for containment of the generated context free grammar against a regular subset of the HTML specification. However, this approach can only check for matching start and end tags in the HTML output, while our technique covers the entire HTML specification. Also, flow-insensitive and context-insensitive approximations in the static analysis techniques used in this method result in false positives, while our method reports only real faults.

Kiezun et al. present a dynamic tool, Ardilla [43], to create SQL and XSS attacks. Their tool uses dynamic tainting, combined concrete and symbolic execution, and attack-candidate generation and validation. Like ours, their tool reports only real faults. However, Kiezun et al. focus on finding security faults, while we concentrate on functional correctness. Their tool builds on and extends the input-generation component of Apollo but does not address the problem of user interaction. It is an interesting area of future research to combine Apollo's user-interaction and state-matching with Ardilla's exploit-detection capabilities.

McAllister et al. [44] also tackle the problem of testing interactive web application. Their approach attempts to follow user interactions. Their method relies on pre-recorded traces of user interactions, while our approach automatically discovers allowable interactions. Moreover, their approach to handling persistent state relies on instrumenting one particular web application framework, Django. In contrast, our approach is to instrument the PHP runtime system and observe database interactions. This allows handling state of PHP applications regardless of any framework they may use.

Benedikt et al. [52] present a tool, VeriWeb, for automatically testing dynamic webpages. They use a model checker to systematically explore all paths (up to a certain bound) of user navigate in a web site. When the exploration encounters HTML forms, VeriWeb uses SmartProfiles. SmartProfiles are user-specified attribute-value pairs that are used to automatically populate forms and supply values that should be provided as inputs. Although VeriWeb can automatically fill in the forms, the human tester needs to pre-populate the user profiles with values that a user would provide. In contrast, Apollo automatically discovers input values by looking at the branch conditions along an execution path.

Dynamic analysis of string values generated by PHP web applications has been considered in a reactive mode to prevent the execution of insidious commands (intrusion prevention) and to raise an alert (intrusion detection) [41], [46], [49]. As far as we know, our work is the first attempt at proactive fault detection in PHP web applications using dynamic analysis. Finally, our work is related to implementation based (as opposed to specification based e.g., [47]) testing of web applications. These works abstract the application behavior using a) client-side information such as user requests and corresponding application responses [36], [38], or b) server-side monitoring information such as user session data [37], [48], or c) static analysis of server-side implementation logic [39]. The approaches that use client-side information or server-side monitoring information are inherently incomplete, and the quality of generated abstractions depends on the quality of the tests run.

Halfond and Orso [39] use static analysis of the server-side implementation logic to extract a web application's interface, i.e., the set of input parameters and their potential values. They implemented their technique for JavaScript. They obtained better code coverage with test cases based on the interface extracted using their technique as compared to the test cases based on the interface extracted using a conventional web crawler. However, the coverage may depend on the choices made by the test generator to combine parameter values—an exhaustive combination of values may be needed to maximize code coverage. In contrast, our work uses dynamic analysis of server side implementation logic for fault detection and minimizes the number of inputs needed to maximize the coverage. Furthermore, we include results on fault detection capabilities of our technique.

Early work on fault localization relied on the use of program slicing [21]. Lyle and Weiser [16] introduce program dicing, a method for combining the information of different program slices. The basic idea is that, when a program computes a correct value for variable x and an incorrect value for variable y, the fault is likely to be found in statements that are in the slice w.r.t. y, but not in the slice w.r.t. x. Variations on this idea technique were later explored by Pan and Spafford [17], and by Agrawal et al. [2].

In the spirit of this early work, Renieris and Reiss [18] use set-union and set-intersection methods for fault localization, so that they compare with their nearest neighbor fault localization technique (discussed below). The set-union technique computes the union of all statements executed by passing test cases and subtracts these from the set of statements executed by a failing test case. The resulting set contains the suspicious statements that the programmer should explore first. In the event that this report does not contain the faulty statement, Renieris and Reiss propose an SDG-based ranking technique in which additional statements are considered based on their distance to previously reported statements along edges in a System Dependence Graph [9]. The set-intersection technique identifies statements that are executed by all passing test cases, but not by the failing test case, and attempts to address errors of omission, where the failing test case neglects to execute a statement.

The nearest neighbors fault localization technique by Renieris and Reiss [18] assumes the existence of a failing test case and many passing test cases. The technique selects the passing test case whose execution spectrum most closely resembles that of the failing test case according to one of two distance criteria, and reports the set of statements that are executed by the failing test case but not by the selected passing test case. One similarity they use measures the distance between two test cases as the cardinality of the symmetric set difference between the statements that they cover. The other measure considers the differences in the relative execution frequencies. In the event that the report does not contain the faulty statement, Renieris and Reiss use the SDG-based ranking technique mentioned above to identify additional statements that should be explored next. Nearest Neighbor was evaluated on the Siemens suite [10], a collection of small C programs for which faulty versions and a large number of test cases are available, and was found to be superior to the set-union and set-intersection techniques.

Cleve and Zeller [5, 25] present a fault-localization technique based on Delta Debugging [24], a binary search and minimization technique. Delta debugging is first employed to identify the variables responsible for a failure, by selectively introducing values that occur in the program state of a failing run into the state obtained during a passing run, and observing whether or not the failure reoccurs. Then, delta debugging is applied again in order to identify cause transitions, i.e., points in the program where one variable ceases to be the cause for a failure, and where another variable starts being the origin of that failure. Cleve and Zeller report finding a real failure in GCC using the technique, and also evaluate their work on the Siemens suite.

Dallmeier et al. [6] present a fault localization technique in which differences between method call sequences that occur in passing and failing executions are used to identify suspicious statements. They evaluate the technique on buggy versions of the NanoXML Java application.

Two recent papers by Jones and Harrold [11] and by Abreu et al. [1] present empirical evaluations of several fault localization techniques, including several of the techniques discussed above, using the Siemens suite. Yu et al. [23] evaluated the sensitivity of several of the fault localization techniques discussed above to test suite reduction. Here, the goal was to determine to what extent the effectiveness of fault localization techniques was reduced as a result of applying several test-suite minimization techniques.

Other fault localization techniques analyze statistical correlations between control flow predicates and failures (see, e.g., [14, 15]), and correlations between changes made by programmers and test failures [20].

In the present invention, the Tarantula technique is applied in a different domain (open-source web applications written in PHP instead of C programs), and adapted to take into account positional information that was obtained from the PHP interpreter. Instead of using artificially seeded faults such as the ones in the Siemens suite, real faults are studied that were exposed by our Apollo 2.0 tool. Moreover, the present invention does not use an existing test suite but relies on Apollo 2.0 to generate a large number of (passing and failing) test cases instead.

Conclusions

The present invention provides a method and system for failure detection and fault localization that leverages combined concrete and symbolic execution [4, 7, 8, 19, 22] and the Tarantula algorithm [11, 12] to automatically find and localize failures in PHP web applications.

The present invention adapts combined concrete and symbolic execution to the domain of web applications by performing dynamic simulation of user interaction in different environment states. Unlike previous fault localization methods, ours does not require a test-suite with passing and failing test cases to be available up front. An output mapping is used between PHP statements and the output they produce in combination with positional information about HTML errors obtained from the oracle to improve on Tarantula's fault localization.

The technique is implemented in Apollo 2.0. In experiments on 6 open-source PHP applications, discovered is our new automatic method for simulating user input significantly improved line coverage and the number of failures found. Discovered also was that a fault localization technique that combines Tarantula with information retrieved from the output mapping is significantly more precise than either Tarantula or the output mappings alone.

The main topic for future work is to explore the use of combined concrete and symbolic execution to generate passing test cases that are highly similar to failing test cases, to further improve the effectiveness of Tarantula.

On Demand Deployment

Detecting and localizing security vulnerabilities in client-server application, in one embodiment, is implemented in an on-demand environment. This on demand embodiment provides a shared architecture to simultaneous serve multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Non-Limiting Hardware Embodiments

Computer System

Overall, the present invention can be realized in hardware or a combination of hardware and software. The processing system, according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits 1112 connected to network 1138. Furthermore, the computer readable medium may comprise computer readable information in a transitory state medium such as a network link and/or a network interface, including a wired network or a wireless network, that allow a computer system to read such computer readable information.

Figure 11:
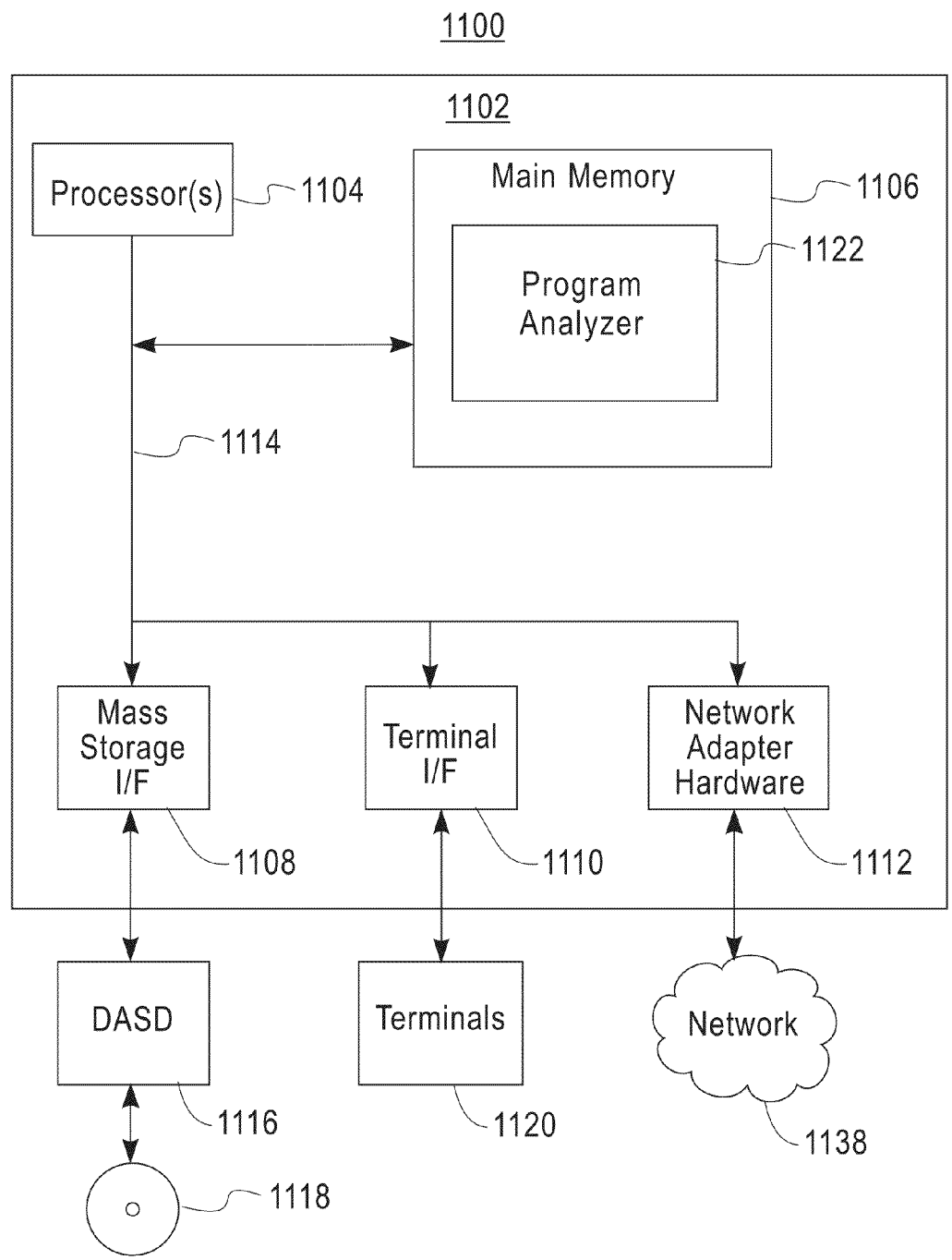
FIG. 11 is a block diagram of a computer system useful for implementing the software steps of the present invention.

An example of a computer system 1100 is shown in FIG. 11. The computer system 1100 includes one or more processors, such as processor 1104. The processor 1104 is connected to a communication infrastructure 1102 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 1100 includes a display interface 1110 that forwards graphics, text, and other data from the communication infrastructure 1102 (or from a frame buffer not shown) for display on the display unit 1120. Computer system 1100 also includes a main memory 1106, preferably random access memory (RAM), and optionally includes a secondary memory 1112. The secondary memory 1108 includes, for example, a hard disk drive 1116 and/or a removable storage drive 1118, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 includes other similar means for allowing computer programs or other instructions to be loaded into computer system 1100. Such means include, for example, a removable storage unit 1118 and an interface 1108. Examples of such include a program cartridge and cartridge interface (such as that found in video game devices), a removable memory chip (such as an EPROM, or PROM) and associated socket, and other removable storage units 1116 and interfaces 1108 which allow software and data to be transferred from the removable storage unit 1118 to computer system 1100.

N-Tiered Architecture

Figure 12:
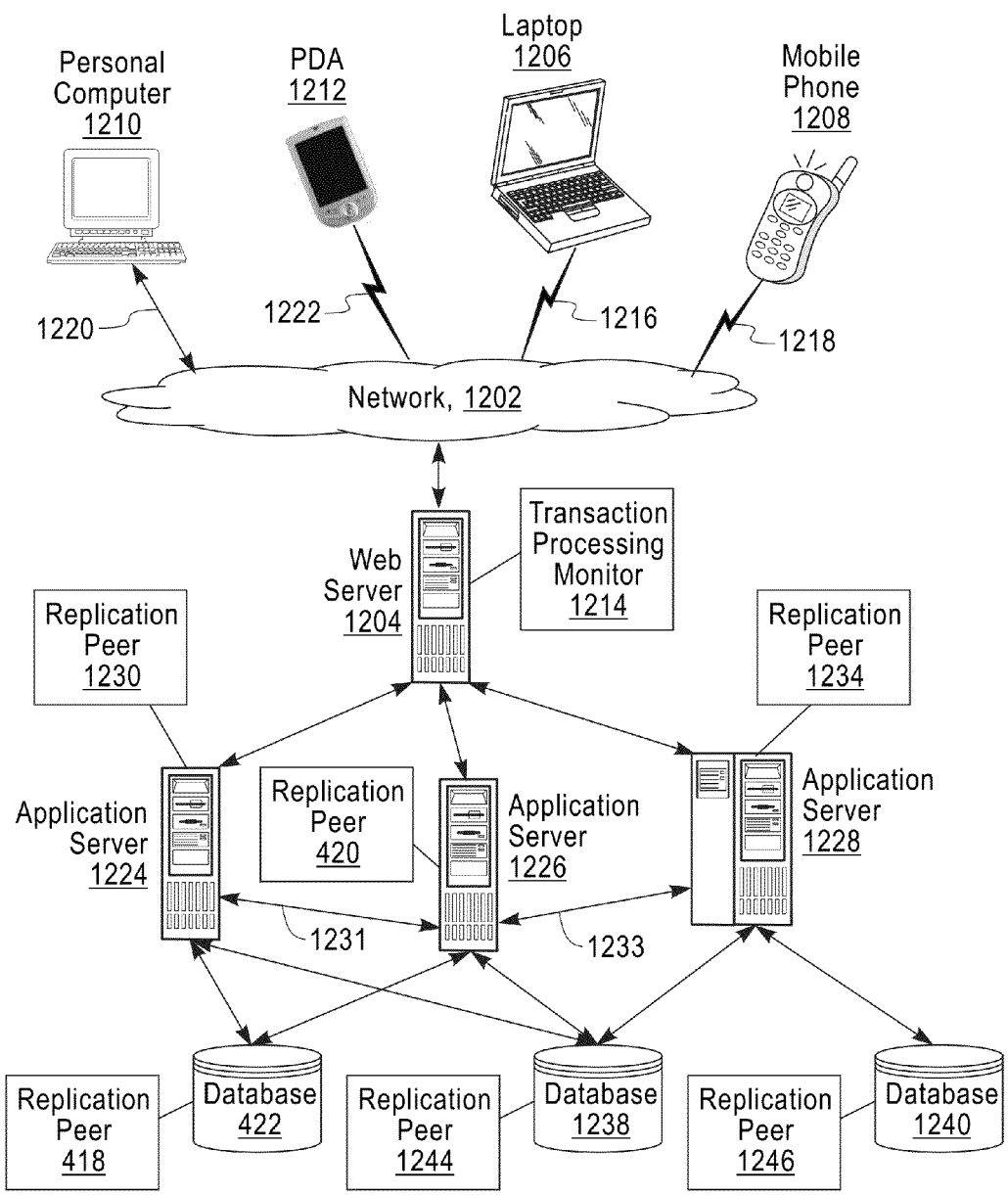
FIG. 12 is a block diagram that illustrates the n-tier architecture useful for implements the software steps of the present invention in another embodiment.

FIG. 12 is a block diagram that illustrates the n-tier architecture useful in implementing the present invention in another embodiment. It is important to note that although only a 3-tier architecture is shown, those of average skill in the computing arts will appreciate that this architecture can be easily extended to four or more tiers as in a multi-tier or n-tier system.

Referring to FIG. 12 shown is a multi-tier system architecture with a tier of clients 1210, 1212, 1206, 1208, a tier of application servers 1224, 1226, 1228, and a tier of non-volatile storage in databases 1238, 1240. This multi-tier client/server architecture improves performance and flexibility for systems with a large number of users. Flexibility in partitioning can be as simple as "dragging and dropping" application code modules onto different computers in some multi-tier architectures.

This multi-tiered system has evolved from a more conventional system architecture in which clients retrieve information from a database, process the data according to instructions from a user, and store the data in the database. The clients in the conventional system architecture have three types of computer instructions installed and running on them to process information: code for the user interface (displaying buttons and lists of data), code for interacting with the database to fetch or store data, and code that processes the fetched data according to commands from the user interface or business logic. In contrast, in the multi-tiered system architecture, the client may contain only user interface code. The code for interacting with the database and processing the data is installed and operating on a middle-tier of servers such as application servers of FIG. 12. The middle tier of servers interacts with the database and processes data on behalf of the client. The multi-tiered system of architecture therefore has these advantages: the forced separation of user interface and business logic, a low bandwidth requirement for the network, and the concentration of business logic code in a few machines—rather than inserting business logic into all application software on all of thousand or millions of clients.

There are a variety of ways of implementing this middle tier, such as transaction processing monitors, message servers, or application servers. The middle tier can perform queuing, application execution, and database staging. For example, if the middle tier provides queuing, the client can deliver its request to the middle layer and disengage because the middle tier will access the data and return the answer to the client. In addition, the middle tier adds scheduling and prioritization for work in progress.

The exemplary web server 1204 of FIG. 12 also has installed and operating on it a transaction processing monitor (TPM) 1214. The TP monitor technology is a type of message queuing, transaction scheduling, and prioritization service where the client connects to the TP monitor (middle tier) instead of the database server. The transaction is accepted by the monitor, which queues it and then takes responsibility for managing it to completion, thus freeing up the client. The TPM 1214 provides applications' services to many clients by multiplexing client transaction requests onto a controlled number of processing routines that support particular services.

The system of FIG. 12 includes several exemplary clients 1210, 1212, 1206, 1208. A client is a computer or a process or thread running on a computer that requests resources or services from another computer. Exemplary clients of FIG. 12 include: a personal computer 1210 coupled to the network 1202 through a wireline connection 1220, a personal digital assistant (PDA) 1212 coupled to the network 1202 through a wireless connection 1222, a laptop computer 1206 coupled to the network 1202 through a wireless connection 1216, and a mobile telephone 1208 which is coupled to the network 1202 through a wireless connection 1218.

The system of FIG. 12 includes a data communications network 1202 which provides for data communications among clients 1210, 1212, 1206, 1208 and web server 1204. A network is a group of computers coupled for data communications according to data communications protocols through other computers typically referred to as routers, bridges, or switches. (The routers, bridges, and switches are not shown on FIG. 12.

The system of FIG. 12 includes web server 1204. A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 1204 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Some caution is advised in use of the terms 'client' and 'server' because whether a particular computer acts as a client or a server depends upon role. In the system of FIG. 12, for example, when web server 1214 receives from personal computer 1210 a request for a web page, web server 1204 is acting as a server; when, however, web server 1204 requests resources from application server 1224 in order to fulfill the request from personal computer 1210, web server 1204 acts as a client.

The system of FIG. 12 also includes application servers 1224, 1226, 1228 coupled for data communications to web server 1204. The application servers 1224, 1226, 1228 are also connected to databases 1238, 1240 and to each other 1231, 1233. The system of FIG. 12 also includes non-volatile storage in the form of databases 1238, 1240. The application servers 1224, 1226, 1228 and the databases 1238, 1240 have installed and operating on them replication peers 1230, 1234, 1244, 1246. A peer is a computer or a process or thread running on a computer that has the same capabilities of requesting and responding to requests as other computers similarly situated in a network. A replication peer is a software module that stores on a replication medium sessions flushed from a replication queue. A replication peer 1244, 1246 may store a session from an application server 1224, 1226, 1228 to non-volatile storage in a database 1238, 1240. A replication peer 1230, 1234 also may store 1231, 1233 a session from an application server 1224, 1226, 1228 into remote random access memory on another application server.

The arrangement of servers and other devices making up the exemplary system illustrated in FIG. 12 are for explanation, not for limitation. Data processing systems useful according to various embodiments of the present invention may include additional servers, routers, other devices, and peer-to-peer architectures, not shown in FIG. 12, as will occur to those of skill in the art. Networks in such data processing systems may be implemented as local area networks (LANs), wide area networks (WANs), intranets, internets, and others as will occur to those of skill in the art. Networks in such data processing systems may support many data communications protocols, including, for example, the Transmission Control Protocol (TCP), the Internet Protocol (IP), the HyperText Transfer Protocol (HTTP), the Wireless Access Protocol (WAP), the Handheld Device Transport Protocol (HDTP), and others as will occur to those of skill in the art. Various embodiments of the present invention may be implemented on a variety of hardware platforms in addition to those illustrated in FIG. 12.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

REFERENCES

Each of the following fifty-two references are hereby incorporated by reference in their entirety.

[1] R. Abreu, P. Zoeteweij, and A. J. C. van Gemund. An evaluation of similarity coeffcients for software fault localization. In PRDC 2006, pages 39-46, 2006.

[2] H. Agrawal, J. R. Horgan, S. London, and W. E. Wong. Fault localization using execution slices and dataflow tests. In ISSRE, pages 143-151, Toulouse, France, 1995.

[3] S. Artzi, A. Kiezun, J. Dolby, F. Tip, D. Dig, A. Paradkar, and M. D. Ernst. Finding bugs in dynamic web applications. In ISSTA, pages 261-272, 2008.

[4] C. Cadar, V. Ganesh, P. M. Pawlowski, D. L. Dill, and D. R. Engler. EXE: automatically generating inputs of death. In CCS, 2006.

[5] H. Cleve and A. Zeller. Locating causes of program failures. In ICSE, pages 342-351, May 2005.

[6] V. Dallmeier, C. Lindig, and A. Zeller. Lightweight defect localization for java. In ECOOP, pages 528-550, 2005.

[7] P. Godefroid, N. Klarlund, and K. Sen. DART: Directed automated random testing. In PLDI, 2005.

[8] P. Godefroid, M. Y. Levin, and D. Molnar. Automated whitebox fuzz testing. In NDSS, 2008.

[9] S. Horwitz, T. Reps, and D. Binkley. Interprocedural slicing using dependence graphs. ACM Trans. Program. Lang. Syst., 12(1):26-60, 1990.

[10] M. Hutchins, H. Foster, T. Goradia, and T. Ostrand. Experiments of the effectiveness of dataflow- and control flow-based test adequacy criteria. In ICSE, pages 191-200, 1994.

[11] J. A. Jones and M. J. Harrold. Empirical evaluation of the Tarantula automatic fault-localization technique. In ASE, pages 273-282, 2005.

[12] J. A. Jones, M. J. Harrold, and J. Stasko. Visualization of test information to assist fault localization. In ICSE, pages 467-477, 2002.

[13] B. Liblit, A. Aiken, A. X. Zheng, and M. I. Jordan. Bug isolation via remote program sampling. In PLDI, pages 141-154, 2003.

[14] B. Liblit, M. Naik, A. X. Zheng, A. Aiken, and M. I. Jordan. Scalable statistical bug isolation. In PLDI '05, pages 15-26, 2005.

[15] C. Liu, X. Yan, L. Fei, J. Han, and S. P. Midki. Sober: statistical model-based bug localization. In FSE, pages 286-295, 2005.

[16] J. Lyle and M. Weiser. Automatic bug location by program slicing. In Proceedings of the Second International Conference on Computers and Applications, pages 877-883, Beijing (Peking), China, 1987.

[17] H. Pan and E. H. Spafford. Heuristics for automatic localization of software faults. Technical Report SERC-TR-116-P, Purdue University, July 1992.

[18] M. Renieris and S. P. Reiss. Fault localization with nearest neighbor queries. In ASE, pages 30-39, 2003.

[19] K. Sen, D. Marinov, and G. Agha. CUTE: A concolic unit testing engine for C. In FSE, 2005.

[20] M. Stoerzer, B. G. Ryder, X. Ren, and F. Tip. Finding Failure-inducing Changes in Java Programs Using Change Classification. In FSE, pages 57-68, Portland, Oreg., USA, Nov. 7-9, 2006.

[21] F. Tip. A survey of program slicing techniques. Journal of Programming Languages, 3(3):121-189, 1995.

[22] G. Wassermann, D. Yu, A. Chander, D. Dhurjati, H. Inamura, and Z. Su. Dynamic test input generation for web applications. In ISSTA, pages 249-260, 2008.

[23] Y. Yu, J. A. Jones, and M. J. Harrold. An empirical study of the effects of test-suite reduction on fault localization. In ICSE, pages 201-210, 2008.

[24] A. Zeller. Yesterday, my program worked. today, it does not why? In FSE, volume 1687 of Lecture Notes in Computer Science, pages 253-267. Springer, September 1999.

[25] A. Zeller. Isolating cause-effect chains from computer programs. In FSE, pages 1-10. ACM Press, November 2002.

[26] S. Anand, P. Godefroid, and N. Tillmann. Demand-driven compositional symbolic execution. In *TACAS*, 2008.

[27] D. Brumley, J. Caballero, Z. Liang, J. Newsome, and D. Song. Towards automatic discovery of deviations in binary implementations with applications to error detection and fingerprint generation. In *Proceedings of 16th USENIX Security Symposium on USENIX Security Symposium*, 2007.

[28] C. Cadar, D. Dunbar, and D. R. Engler. Klee: Unassisted and automatic generation of high-coverage tests for complex systems programs. In *OSDI*, 2008.

[29] C. Cadar and D. R. Engler. Execution generated test cases: How to make systems code crash itself. In *SPIN*, 2005.

[30] M. Emmi, R. Majumdar, and K. Sen. Dynamic test input generation for database applications. In *ISSTA*, 2007.

[31] P. Godefroid. Compositional dynamic test generation. In *POPL*, 2007.

[32] P. Godefroid, A. Kie•zun, and M. Y. Levin. Grammar-based whitebox fuzzing. In *PLDI*, 2008.

[33] K. Inkumsah and T. Xie. Evacon: a framework for integrating evolutionary and concolic testing for object-oriented programs. In *ASE*, 2007.

[34] R. Majumdar and K. Sen. Hybrid concolic testing. In *ICSE*, 2007.

[35] R. Majumdar and R.-G. Xu. Directed test generation using symbolic grammars. In *ASE*, 2007.

[36] S. Elbaum, K.-R. Chilakamarri, M. Fisher, and G. Rothermel. Web application characterization through directed requests. In *WODA*, 2006.

[37] S. Elbaum, S. Kane, G. Rothermel, and M. Fisher. Leveraging usersession data to support Web application testing. *IEEE Trans. Softw.Eng.*, 31(3), 2005.

[38] M. Fisher, S. G. Elbaum, and G. Rothermel. Dynamic characterization of Web application interfaces. In *FASE*, 2007.

[39] W. G. J. Halfond and A. Orso. Improving test case generation for Web applications using automated interface discovery. In *ESEC-FSE*, 2007.

[40] Y.-W. Huang, F. Yu, C. Hang, C.-H. Tsai, D. T. Lee, and S.-Y. Ku. Verifying Web applications using bounded model checking. In *Proceedings of International Conference on Dependable Systems and Networks*, 2004.

[41] M. Johns and C. Beyerlein. SMask: preventing injection attacks in Web applications by approximating automatic data/code separation. In *SAC*, 2007.

[42] N. Jovanovic, C. Kruegel, and E. Kirda. Pixy: A static analysis tool for detecting Web application vulnerabilities (short paper). In *Security and Privacy*, 2006.

[43] A. Kie•zun, P. Guo, K. Jayaraman, and M. Ernst. Automatic creation of SQL injection and cross-site scripting attacks. In *Proceedings of International Conference of Software Engineering (ICSE)*, 2009.

[44] S. McAllister, E. Kirda, and C. Kruegel. Leveraging user interactions for in-depth testing of web applications. In *RAID '08: Proceedings of the 11th international symposium on Recent Advances in Intrusion Detection*, pages 191-210, Berlin, Heidelberg, 2008. Springer-Verlag.

[45] Y. Minamide. Static approximation of dynamically generated Web pages. In *WWW*, 2005.

[46] T. Pietraszek and C. V. Berghe. Defending against injection attacks through context-sensitive string evaluation. In *RAID*, 2005.

[47] F. Ricca and P. Tonella. Analysis and testing of Web applications. In *ICSE*, 2001.

[48] S. Sprenkle, E. Gibson, S. Sampath, and L. Pollock. Automated replay and failure detection for Web applications. In *ASE*, 2005.

[49] Z. Su and G. Wassermann. The essence of command injection attacks in Web applications. In *POPL*, 2006.

[50] G. Wassermann and Z. Su. Sound and precise analysis of Web applications for injection vulnerabilities. In *PLDI*, 2007.

[51] Y. Xie and A. Aiken. Static detection of security vulnerabilities in scripting languages. In *USENIX-SS*, 2006.

[52] M. Benedikt, J. Freire, and P. Godefroid. VeriWeb: Automatically testing dynamic Web sites. In *WWW*, 2002.

What is claimed is:

1. A computer-implemented method for analyzing a set of two or more communicating applications comprising a plurality of code fragments, the computer-implemented method comprising:

dynamically executing or statically analyzing at least one of
a plurality of code fragments as part of a first application, and a plurality of code fragments as part of a second application,
wherein the first application and the second application are communicating at least one of data and control with each other;
recording a correlation between each code fragment in the plurality of code fragments in at least one of the first application and the second application that have been executed and at least one execution characteristic that the code fragments exhibited on execution, wherein said correlation indicates a likelihood that the code fragment contributed to the execution characteristic;
performing with at least one of a static oracle and a dynamic oracle, an analysis of at least a portion of the code fragments that comprise the first application that have been executed wherein said analysis includes mapping validation faults observed in an output of the first or the second program to a subset of the plurality of code fragments that generated the faults observed in the output; and
prioritizing the plurality of code fragments in at least one of the first application and the second application based on the mapping produced by the oracle, and based on the correlation between each code fragment in the plurality the code fragments that have been executed and the execution characteristic exhibited by the code fragments.

2. The computer implemented method of claim 1, wherein the evaluation produced by the oracle is a fault localization evaluation.

3. A computer-implemented method for analyzing a set of two or more communicating applications comprising a plurality of code fragments, the computer-implemented method comprising:

executing at least a plurality of code fragments as part of a first application and executing at least a plurality of the code fragments as part of a second application, wherein the first application and the second application are communicating with each other;
recording a correlation between each code fragment in the plurality of code fragments in at least one of the first application and the second application that have been executed and at least one execution characteristic that the code fragments exhibited on execution, wherein said correlation indicates a likelihood that the code fragment contributed to the execution characteristic;
determining with an oracle an analysis of at least a portion of the code fragments that comprise the first application that have been executed wherein said analysis includes mapping validation faults observed in an output of the first or the second program to a subset of the plurality of code fragments that generated the faults observed in the output, and wherein an execution of the first application causes at least one of a change of state in the second application and a change control flow in the second application; and
prioritizing the plurality of code fragments in at least one of the first application and the second application based on the mapping produced by the oracle, and based on the correlation between each code fragment in the plurality code fragments that have been executed and the execution characteristic exhibited by the code fragments.

4. The computer implemented method of claim 3, wherein the evaluation produced by the oracle is a fault localization evaluation.

5. The computer implemented method of claim 3, wherein the first application and the second application are communicating with each other via message passing.

6. The computer implemented method of claim 3, wherein the first application and the second application are part of an N-tiered distributed program.

7. The computer implemented method of claim 3, further comprising:
determining with an oracle an analysis of at least a portion of the code fragments that comprise the second application that have been executed.

8. The computer implemented method of claim 3, further comprising:
executing of the second application to cause a flow of information between the first application and the second application.

9. The computer implemented method of claim 3, wherein the determining with an oracle includes an analysis of at least a portion of the code fragments for client-server security related information.

10. The computer implemented method of claim 9, wherein the security related information includes a violation of information flow.

11. The computer implemented method of claim 10, wherein the violation of information flow includes untrusted information flowing into a trusted application.

12. The computer implemented method of claim 10, wherein the violation of information flow includes private data flowing into a public application.

13. A computer program product for analyzing a set of two or more communicating applications comprising a plurality of code fragments, the computer program product comprising:
a non-transitory storage medium readable by a computer system, the computer readable medium storing software programming instructions capable of performing with a processor programming code to carry out:
executing at least a plurality of code fragments as part of a first application and executing at least a plurality of the code fragments as part of a second application, wherein the first application and the second application are communicating with each other;
recording a correlation between each code fragment in the plurality of code fragments in at least one of the first application and the second application that have been executed and at least one execution characteristic that the code fragments exhibited on execution, wherein said correlation indicates a likelihood that the code fragment contributed to the execution characteristic;
determining with an oracle an analysis of at least a portion of the code fragments that comprise the first application that have been executed wherein said analysis includes mapping validation faults observed in an output of the first or the second program to a subset of the plurality of code fragments that generated the faults observed in the output, and wherein an execution of the first application causes at least one of a change of state in the second application and a change control flow in the second application; and
prioritizing the plurality of code fragments in at least one of the first application and the second application based on the mapping produced by the oracle, and based on the correlation between each code fragment in the plurality code fragments that have been executed and the execution characteristic exhibited by the code fragments.

14. The computer program product of claim 13, wherein the evaluation produced by the oracle is a fault localization evaluation.

15. The computer program product of claim 13, wherein the first application and the second application are communicating with each other via message passing.

16. The computer program product of claim 13, wherein the first application and the second application are part of an N-tiered distributed program.

17. The computer program product of claim 13, further comprising:
determining with an oracle an analysis of at least a portion of the code fragments that comprise the second application that have been executed.

18. The computer program product of claim 13, further comprising: executing of the second application to cause a flow of information between the first application and the second application.

19. The computer program product of claim 13, wherein the determining with an oracle includes an analysis of at least a portion of the code fragments for client-server security related information.

20. The computer program product of claim 19, wherein the security related information includes a violation of information flow.

21. The computer program product of claim 18, wherein the violation of information flow includes untrusted information flowing into a trusted application.

22. The computer program product of claim 18, wherein the violation of information flow includes private data flowing into a public application.

23. A system for analyzing a set of two or more communicating applications comprising a plurality of code fragments, the system comprising:
a computer memory capable of storing machine instructions; and
a processor in communication with said computer memory, said processor capable of accessing said machine instructions to perform:
executing at least a plurality of code fragments as part of a first application and executing at least a plurality of the code fragments as part of a second application, wherein the first application and the second application are communicating with each other;
recording a correlation between each code fragment in the plurality of code fragments in at least one of the first application and the second application that have been executed and at least one execution characteristic that the code fragments exhibited on execution, wherein said correlation indicates a likelihood that the code fragment contributed to the execution characteristic;
determining with an oracle an analysis of at least a portion of the code fragments that comprise the first application that have been executed wherein said analysis includes mapping validation faults observed in an output of the first or the second program to a subset of the plurality of code fragments that generated the faults observed in the output, and wherein an execution of the first application causes at least one of a change of state in the second application and a change control flow in the second application; and
prioritizing the plurality of code fragments in at least one of the first application and the second application based on the mapping produced by the oracle, and based on the correlation between each code fragment in the plurality code fragments that have been executed and the execution characteristic exhibited by the code fragments.

24. The system of claim 23, wherein the wherein the evaluation produced by the oracle is a fault localization evaluation.

25. The system of claim 23, wherein the first application and the second application are communicating with each other via message passing.

* * * * *